(12) United States Patent
Bohorquez Arevalo et al.

(10) Patent No.: US 12,140,570 B2
(45) Date of Patent: Nov. 12, 2024

(54) METHOD AND SYSTEM TO ANALYSE PIPELINE CONDITION

(71) Applicant: THE UNIVERSITY OF ADELAIDE, Adelaide (AU)

(72) Inventors: Jessica Maria Bohorquez Arevalo, Adelaide (AU); Angus Simpson, Adelaide (AU); Martin Lambert, Adelaide (AU); Bradley James Alexander, Adelaide (AU)

(73) Assignee: THE UNIVERSITY OF ADELAIDE, South Australia (AU)

( * ) Notice: Subject to any disclaimer, the term of this patent is extended or adjusted under 35 U.S.C. 154(b) by 757 days.

(21) Appl. No.: 17/295,969

(22) PCT Filed: Nov. 22, 2019

(86) PCT No.: PCT/AU2019/000148
§ 371 (c)(1),
(2) Date: May 21, 2021

(87) PCT Pub. No.: WO2020/102846
PCT Pub. Date: May 28, 2020

(65) Prior Publication Data
US 2022/0011275 A1    Jan. 13, 2022

(30) Foreign Application Priority Data
Nov. 23, 2018    (AU) .................... 2018904476

(51) Int. Cl.
*G01N 29/44*    (2006.01)
*F17D 5/00*    (2006.01)
(Continued)

(52) U.S. Cl.
CPC ............. *G01N 29/44* (2013.01); *F17D 5/00* (2013.01); *G01M 3/02* (2013.01); *G01M 3/2815* (2013.01);
(Continued)

(58) Field of Classification Search
USPC ........................................... 702/51
See application file for complete search history.

(56) References Cited

U.S. PATENT DOCUMENTS 5,708,193 A * 1/1998 Ledeen ............... G01M 3/2807
73/40
10,094,732 B2   10/2018 Linford
(Continued)

FOREIGN PATENT DOCUMENTS

| CN | 101008992 | 8/2007 |
| CN | 103529365 | 1/2014 |

(Continued)

OTHER PUBLICATIONS

Caputo et al. "Using Neural Networks to Monitor Piping Systems," Process Safety Progress, Jun. 2003, vol. 22, No. 2, pp. 119-127.
(Continued)

*Primary Examiner* — Paul D Lee
(74) *Attorney, Agent, or Firm* — Sheridan Ross P.C.

(57) ABSTRACT

A method and system for analysing a condition of a pipeline in real time is disclosed. The method and system comprise generating a transient pressure wave in fluid carried along the pipeline and detecting a transient pressure wave interaction signal responsive to the transient pressure wave where the pressure wave interaction signal has a time duration corresponding to a region of interest of the pipeline. The method and system further includes processing the transient pressure wave interaction signal to analyse the region of interest of the pipeline.

20 Claims, 27 Drawing Sheets

(51) Int. Cl.
  *G01M 3/02*   (2006.01)
  *G01M 3/28*   (2006.01)
  *G06N 3/04*   (2023.01)
  *F17D 5/02*   (2006.01)
  *F17D 5/06*   (2006.01)
  *G06N 3/02*   (2006.01)

(52) U.S. Cl.
  CPC ............... *G06N 3/04* (2013.01); *F17D 5/02* (2013.01); *F17D 5/06* (2013.01); *G06N 3/02* (2013.01)

(56) References Cited

U.S. PATENT DOCUMENTS

| | | | |
|---|---|---|---|
| 2012/0041694 A1 | 2/2012 | Stephens et al. | |
| 2013/0066568 A1 | 3/2013 | Alonso | |
| 2014/0224026 A1 | 8/2014 | Linford et al. | |
| 2018/0202612 A1* | 7/2018 | Simpson | G01B 13/06 |
| 2018/0321110 A1* | 11/2018 | Gong | G01M 3/2815 |
| 2020/0065677 A1* | 2/2020 | Iriarte Lopez | E21B 49/006 |

FOREIGN PATENT DOCUMENTS

| | | |
|---|---|---|
| CN | 109931506 | 6/2019 |
| WO | WO 2012/159184 | 11/2012 |
| WO | WO 2017/008100 | 1/2017 |
| WO | WO 2017/011850 | 1/2017 |

OTHER PUBLICATIONS

Mashford et al. "An Approach to Leak Detection in Pipe Networks Using Analysis of Monitored Pressure Values by Support Vector Machine," 2009 Third International Conference on Network and System Security, 2009, pp. 534-539.

International Search Report and Written Opinion for International (PCT) Patent Application No. PCT/AU2019/000148, dated Feb. 11, 2020, pp. 1-7.

Li Hui "Research on Fault Diagnose Method of Pipeline Leakage Based on Hybrid Model," Northeastern University, Jun. 2013, Master's Thesis, 88 pages (with English translation of p. 12).

Belsito et al. "Leak Detection in Liquefied Gas Pipelines by Artificial Neural Networks," AIChE Journal, Dec. 1998, vol. 44, No. 12, pp. 2675-2688.

Santos et al. "Real-time Monitoring of Gas Pipeline Through Artificial Neural Networks," IEEE, 2013 BRICS Congress on Computational Intelligence & 11th Brazilian Congress on Computational Intelligence, Sep. 2013, pp. 329-334.

Zan et al. "Event Detection and Localization in Urban Water Distribution Network," IEEE Sensors Journal, Dec. 2014, vol. 14, No. 12, pp. 4134-4142.

* cited by examiner

METHOD AND SYSTEM TO ANALYSE PIPELINE CONDITION

CROSS-REFERENCE TO RELATED APPLICATIONS

This application is a national stage application under 35 U.S.C. 371 and claims the benefit of PCT Application No. PCT/AU2019/000148 having an international filing date of 22 Nov. 2019, which designed the United States, which PCT application claimed the benefit of Australian Provisional Patent application Ser. No. 2018904476 titled "METHOD AND SYSTEM TO ANALYSE PIPELINE CONDITION" and filed on 23 Nov. 2018, the contents of each of which are hereby incorporated by reference in their entireties.

INCORPORATION BY REFERENCE

The following publications are referred to in the present application and their contents are hereby incorporated by reference in their entirety:

International Patent Application No. PCT/AU2009/001051 (WO2010017599) titled "METHOD AND SYSTEM FOR ASSESSMENT OF PIPELINE CONDITION" and filed on 13 Aug. 2009 in the name of Adelaide Research & Innovation Pty Ltd.

International Patent Application No PCT/AU2015/000415 (WO 2017008098) titled "MULTIPLE TRANSDUCER METHOD AND SYSTEM FOR PIPELINE ANALYSIS" and filed on 16 Jul. 2015 in the name of Adelaide Research & Innovation Pty Ltd.

International Patent Application No. PCT/AU2016/000246 (WO2017008100) titled "SYSTEM AND METHOD FOR GENERATION OF A PRESSURE SIGNAL" and filed on 8 Jul. 2016 in the name of The University of Adelaide.

The content of each of the above publications is incorporated by reference in their entirety.

TECHNICAL FIELD

The present disclosure relates to analysing the condition of a pipeline carrying a fluid. In a particular form, the present disclosure relates to a pipeline analysis system based on analysing the response to the generation of a pressure wave in the pipeline.

BACKGROUND

Water transmission and distribution pipelines are critical infrastructure for modern cities. Due to the sheer size of the networks and the fact that most pipelines are buried underground, the health monitoring and maintenance of this infrastructure is challenging. Similarly, pipes and pipeline systems may be used to convey any number of types of fluid ranging from petroleum products to natural gas. To overcome the difficulties in monitoring, analysing and assessing pipeline networks, different non-invasive condition assessment techniques have been developed to characterise pipelines including visual inspection, electromagnetic methods, acoustic methods, ultrasonic, radiographic, thermographic methods and more recently transient-based techniques involving the generation of a transient pressure wave and analysing the response of the pipeline.

These transient-based methods have received more attention as they provide for the inspection of long sections of a pipe with a relatively simple system set up. These methods are based on the interpretation of the effect that any hydraulic characteristic or feature in a pipeline will have on a measured transient pressure trace following the generation of a transient pressure wave in the pipeline such as resulting from a water hammer event.

In order to detect faults by using transient pressure signals, several approaches have been adopted including:
visual analysis of the transient pressure traces to identify reflections in the pressure traces;
analysis of the damping of the transient signal;
inverse transient analysis (ITA) involving forming a full parameterised numerical simulation model of the pipeline and adjusting these parameters to fit the measured pressure trace to characterise features in the pipeline; and
frequency domain techniques which typically involve determining the frequency or impulse response function of the pipeline system.

However, while each of these approaches has been moderately successful depending on the assessment task they also have associated disadvantages. As would be expected, the visual analysis approach which can identify certain large scale hydraulic characteristics lacks the required preciseness and reproducibility due to the subjective nature of the analysis. Similarly, analysis of the damping of the initial transient pressure wave has only been used to locate and characterise leaks. It is not entirely general for a pipeline given that, depending on the parameters of the pipeline and the size and location of the leak, an inaccurate estimate of steady-state friction can lead to an incorrect determination of the leak damping which is the key feature for the performance of this method.

ITA techniques have been successively applied to some limited pipeline assessment tasks such as leak detection. One example system principally directed to the detection of distributed deterioration, such as wall thickness changes due to large scale corrosion, is described in International Patent Application No. PCT/AU2009/001051 (WO/2010/017599) titled "METHOD AND SYSTEM FOR ASSESSMENT OF PIPELINE CONDITION", whose entire contents are incorporated by reference in their entirety in the present disclosure. This application, filed in the name of Adelaide Research & Innovation Pty Ltd, which is a related entity to the Applicant here, discloses a method and system for determining the location and extent of multiple variations in pipeline condition based on an inverse transient analysis (ITA) which adopts an iterative approach to determine a full condition assessment of a pipeline based on optimisation techniques. While this approach has been very successful, it is generally extremely computationally intensive and as such requires the off line analysis of the measured pressure trace data before conclusions can be reached in relation to pipeline condition.

Frequency domain techniques have also been successfully applied to pipeline assessment tasks such as the application of the impulse response function to locate leaks, blockages, and the variation of wall thickness in configurations such as single pipelines, pipelines in series or simple networks. One example system is described in International Patent Application No PCT/AU2015/000415 (WO 2017008098) titled "MULTIPLE TRANSDUCER METHOD AND SYSTEM FOR PIPELINE ANALYSIS", filed in the name of Adelaide Research & Innovation Pty Ltd, which is a related entity to the Applicant here, and whose entire contents are incorporated by reference in their entirety in the present disclosure. However, these techniques are also computationally intensive as in the case of the Inverse Transient Analysis approach. They also require accurate modelling of the entire pipeline system. As a result, all the previous techniques require offline analysis of the measured pressure trace data before conclusions can be reached in relation to pipeline condition.

In view of the foregoing, there is a need for a method and system for analysing the condition of a pipeline which is capable of performing in real time and being implemented on site.

SUMMARY

In one aspect, the present disclosure provides a method for analysing a condition of a pipeline in real time, comprising:
  generating a transient pressure wave in fluid carried along the pipeline;
  detecting a transient pressure wave interaction signal responsive to the transient pressure wave, the pressure wave interaction signal having a time duration corresponding to a region of interest of the pipeline; and
  processing the transient pressure wave interaction signal to analyse the region of interest of the pipeline.

In another form, processing the transient pressure wave interaction signal comprises:
  downsampling in the time domain the transient pressure wave interaction signal to generate a downsampled time window of pressure information;
  processing the downsampled time window of pressure information by an artificial neural network (ANN) trained to identify a hydraulic feature of a first type and determine associated hydraulic feature characteristics of the hydraulic feature of the first type; and
  verifying whether the hydraulic feature of the first type occurs in the region of interest of the pipeline.

In another form, verifying whether the hydraulic feature of the first type occurs in the region of interest comprises determining whether one or more of the determined associated hydraulic feature characteristics of the hydraulic feature of the first type are within physical constraints of the pipeline.

In another form, verifying whether the hydraulic feature of the first type occurs in the region of interest, comprises:
  numerically generating a transient pressure wave interaction signal based on the hydraulic feature of the first type and the associated determined hydraulic feature characteristics;
  comparing the numerically generated transient pressure wave interaction signal with the detected transient pressure wave interaction signal to verify that the hydraulic feature of the first type occurs in the region of interest.

In another form, the method further comprises:
  processing the downsampled time window of pressure information by an artificial neural network (ANN) trained to determine a hydraulic feature of a second type and determine associated hydraulic feature characteristics of the hydraulic feature of the second type; and
  verifying whether the hydraulic feature of the second type occurs in the region of interest of the pipeline.

The method of claim 5, wherein verifying whether a hydraulic feature of the second type occurs in the region of interest comprises determining whether one or more associated determined hydraulic feature characteristics of the hydraulic feature of the second type are within physical constraints of the pipeline.

In another form, verifying whether a hydraulic feature of the second type occurs comprises:
  numerically generating a transient pressure wave interaction signal based on the hydraulic feature of the second type and the associated determined hydraulic feature characteristics; and
  comparing the numerically generated transient pressure wave interaction signal with the detected transient pressure wave interaction signal to verify that the hydraulic feature of the second type occurs in the region of interest.

In another form, verifying whether a hydraulic feature of a selected type occurs comprises:
  numerically generating a transient pressure wave interaction signal based on the hydraulic feature of the selected type and the associated determined hydraulic feature characteristics of the hydraulic feature of the selected type;
  downsampling in the time domain the numerically generated transient pressure wave interaction signal to determine a numerically generated downsampled time window of pressure information; and
  comparing the numerically generated downsampled time window of pressure information with the detected downsampled time window of pressure information to verify that the hydraulic feature of the selected type occurs in the region of interest.

In another form, an associated hydraulic feature characteristic includes the location of the hydraulic feature.

In another form, an ANN trained to identify a hydraulic feature of a selected type and determine associated hydraulic feature characteristics of the hydraulic feature of the selected type is trained by:
  selecting a range of values of the associated hydraulic feature characteristics of the hydraulic feature of the selected type;
  numerically generating respective transient pressure wave interaction signals for the range of values of the hydraulic feature characteristics based on a hydrodynamic model of the pipeline;
  downsampling in the time domain the respective transient pressure wave interaction signals to form respective downsampled time windows of pressure information each having a size or dimension corresponding to the input dimension of the ANN;
  training the ANN to identify the hydraulic feature of the selected type and determine the associated values of the hydraulic feature characteristics based on each of the downsampled time windows of pressure information and corresponding values of the hydraulic feature characteristics used to generate the downsampled time window of pressure information.

In another form, training the ANN to identify the hydraulic feature of the selected type and determine the associated values of the hydraulic feature characteristics comprises training the ANN using one or more empirically measured downsampled time windows of pressure information and corresponding values of the hydraulic feature characteristics originating from the hydraulic feature of the selected type.

In a second aspect, the present disclosure provides a system for analysing the condition of a pipeline, the system including:
  a transient pressure wave generator for generating a transient pressure wave in fluid carried along the pipe;
  a pressure detector for detecting a transient pressure wave interaction signal having a time duration corresponding to a region of interest of the pipeline;

an analysis module comprising one or more data processors for processing in real-time the transient pressure wave interaction signal to analyse the region of interest of the pipeline.

In another form, processing the transient pressure wave interaction signal by the analysis module comprises:

downsampling in the time domain the transient pressure wave interaction signal to generate a downsampled time window of pressure information;

processing the downsampled time window of pressure information by an artificial neural network (ANN) trained to identify a hydraulic feature of a first type and determine associated hydraulic feature characteristics of the hydraulic feature of the first type; and verifying whether the hydraulic feature of the first type occurs in the region of interest of the pipeline.

In another form, verifying by the analysis module whether the hydraulic feature of the first type occurs in the region of interest comprises determining whether one or more of the determined associated hydraulic feature characteristics of the hydraulic feature of the first type are within physical constraints of the pipeline.

In another form, verifying by the analysis module whether the hydraulic feature of the first type occurs in the region of interest comprises:

numerically generating a transient pressure wave interaction signal based on the hydraulic feature of the first type and the associated determined hydraulic feature characteristics;

comparing the numerically generated transient pressure wave interaction signal with the detected transient pressure wave interaction signal to verify that the hydraulic feature of the first type occurs in the region of interest.

In another form, the system further comprises:

processing by the analysis module the downsampled time window of pressure information by an artificial neural network (ANN) trained to determine a hydraulic feature of a second type and determine associated hydraulic feature characteristics of the hydraulic feature of the second type; and verifying by the analysis module whether the hydraulic feature of the second type occurs in the region of interest of the pipeline.

In another form, verifying by the analysis module whether a hydraulic feature of the second type occurs in the region of interest comprises determining whether one or more associated determined hydraulic feature characteristics of the hydraulic feature of the second type are within physical constraints of the pipeline.

In another form, verifying by the analysis module whether a hydraulic feature of the second type occurs comprises:

numerically generating a transient pressure wave interaction signal based on the hydraulic feature of the second type and the associated determined hydraulic feature characteristics; and comparing the numerically generated transient pressure wave interaction signal with the detected transient pressure wave interaction signal to verify that the hydraulic feature of the second type occurs in the region of interest.

In another form, verifying by the analysis module whether a hydraulic feature of a selected type occurs comprises:

numerically generating a transient pressure wave interaction signal based on the hydraulic feature of the selected type and the associated determined hydraulic feature characteristics of the hydraulic feature of the selected type;

downsampling in the time domain the numerically generated transient pressure wave interaction signal to determine a numerically generated downsampled time window of pressure information; and comparing the numerically generated downsampled time window of pressure information with the detected downsampled time window of pressure information to verify that the hydraulic feature of the selected type occurs in the region of interest.

In another form, an associated hydraulic feature characteristic includes the location of the hydraulic feature.

In another form, an ANN trained to identify a hydraulic feature of a selected type and determine associated hydraulic feature characteristics of the hydraulic feature of the selected type is trained by:

selecting a range of values of the associated hydraulic feature characteristics for the hydraulic feature of the selected type;

numerically generating respective transient pressure wave interaction signals for the range of values of the hydraulic feature characteristics based on a hydrodynamic model of the pipeline;

downsampling in the time domain the respective transient pressure wave interaction signals to form respective downsampled time windows of pressure information each having a size or dimension corresponding to the input dimension of the ANN;

training the ANN to identify the hydraulic feature of the selected type and determine the associated values of the hydraulic feature characteristics based on each of the downsampled time windows of pressure information and the corresponding values of the hydraulic feature characteristics used to generate the downsampled time window of pressure information.

In another form, training the ANN to identify the hydraulic feature of the selected type and determine the associated values of the hydraulic feature characteristics comprises training the ANN using one or more empirically measured downsampled time windows of pressure information and corresponding values of the hydraulic feature characteristics originating from the hydraulic feature of the selected type.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
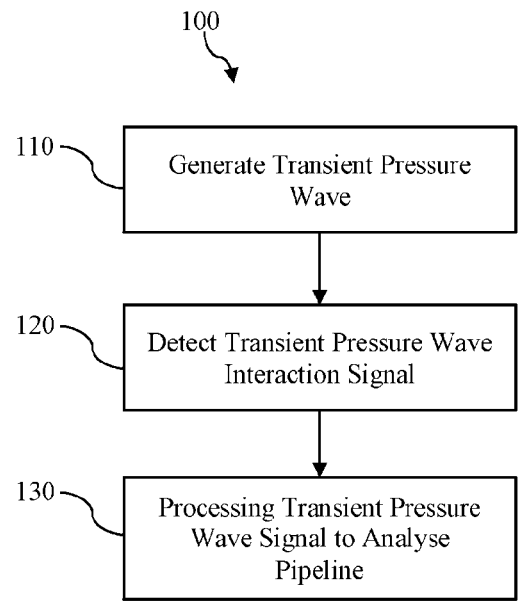
FIG. 1 is a flowchart of a method for analysing the condition of a pipeline in real time in accordance with an illustrative embodiment.

Referring now to FIG. 1, there is shown a method 100 for analysing the condition of a pipeline in real time according to an illustrative embodiment. In this illustrative embodiment, the pipeline or pipeline system is of the type that is used as a transmission pipeline typically extending over many kilometres to carry large volumes of water for use by urban or agricultural centres. As would be appreciated, the method and system of the present disclosure may be applied to any pipeline employed for carrying or conveying a fluid from a first location to at least a second location. The method and system of the present disclosure are applicable to urban areas where pipelines have been isolated by closed valves or are connected to junctions. In addition, this method is also applicable to water transmission pipes, pipelines in chemical plants, wastewater pumping pipelines and oil and gas pipelines.

Throughout this specification the term "real time" when pertaining to the pipeline analysis method and system of the present disclosure is taken to mean that the results of the method and system are available substantially in real time, or near real time, as compared to the time involved in the generation of the transient pressure wave and detection of the responsive pressure wave interaction signal and further that the results do not require additional or further analysis by off-site computer processing resources. It is understood that the term "real time" is not intended to require that the method and system of the present disclosure provide results instantaneously to an operator.

Throughout the specification the term "hydraulic feature" when referring to a pipeline is taken to mean any characteristic or component of the pipeline that affects the hydraulic performance of the pipeline. As will be seen below, there are many different types of hydraulic features and they may be broadly categorised in two main groups.

The first group consists of topological features of the pipeline and includes, but is not limited to, the following hydraulic feature types:
- a change in pipe material;
- a change in pipe diameter;
- a change in pipe lining;
- a change in pipe wall thickness;
- a change in pipe class;
- a valve, also including, but not limited to, the following valve sub-types:
  - an inline valve (partially or fully closed);
  - a scour valve;
  - a valve on an entry to a branch pipeline (partially or fully closed);
  - an air valve; or
  - a valve in a branch or offtake pipe;
- a pipe series junction comprising a closed or open branch pipeline section extending from the pipeline;
- an off-take; or
- a tank.

The second group contains anomalies or defects of the pipeline and includes, but is not limited to, the following hydraulic feature types:
- a short reach in the pipeline with significant wall deterioration;
- a leak;
- a burst;
- a blockage; or
- an air pocket.

As would be appreciated each of the above hydraulic feature types will have at least one associated hydraulic feature characteristic, this being the location of the hydraulic feature with respect to the pipeline. Other associated hydraulic feature characteristics will depend on the hydraulic feature type and set out below is a non-exhaustive list of some associated hydraulic feature characteristics for the above hydraulic feature types.

| Hydraulic Feature | Hydraulic Feature Characteristic |
|---|---|
| Change in pipe material | List of materials |
| Change in pipe diameters | Ratio of diameters |
| Change in pipe lining | Ratio of pipe lining |
| Change in pipe wall thickness | Ratio of wall thickness |
| Change in pipe class | Ratio of wall thickness |
| Valve | Diameter of the valve |
| Pipe series junction | Ratio of diameters in the junction |
| Off-take | Diameter of the off-take |
| Tank | Volume of the tank |
| Pipeline with wall deterioration | Deteriorated wall thickness |
| Leak | Diameter of the leak |
| Burst | Flow of the burst |
| Blockage | Blocked diameter |
| Air pocket | Volume of air pocket |

Figure 2:
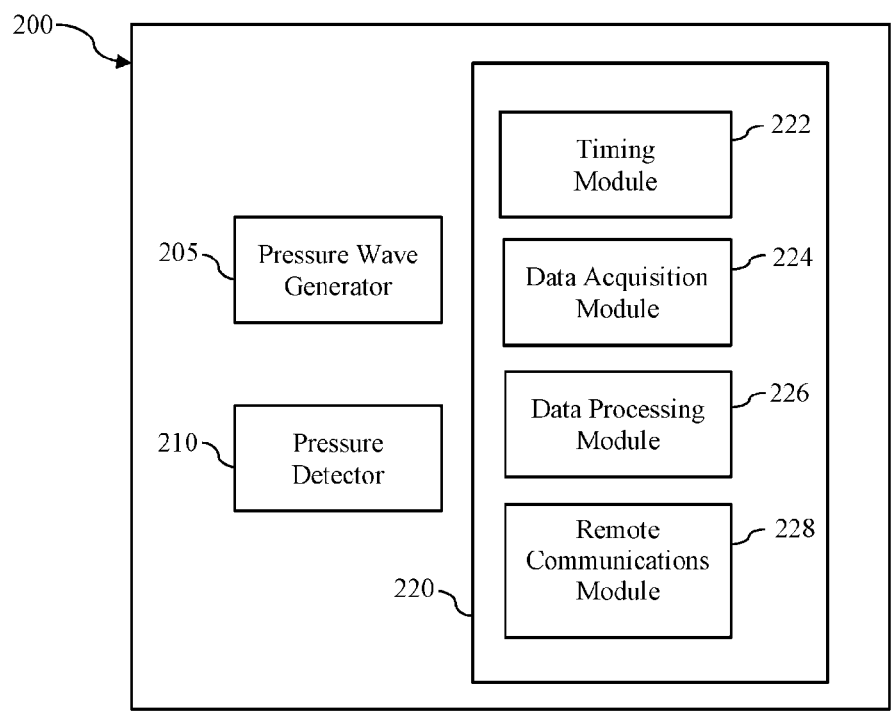
FIG. 2 is a system overview diagram of a system for real time analysis of the condition of a pipeline in accordance with an illustrative embodiment.

At step 110 of FIG. 1, a transient pressure wave is generated in the fluid carried along the pipeline by in this example a pressure wave generator. Referring also to FIG. 2, there is shown a pipeline analysis system 200 for analysing the condition of a pipeline according to an illustrative embodiment operable to implement method 100. In this illustrative embodiment, analysis system 200 includes a transient pressure wave generator 205 for generating a transient pressure wave in the fluid of the pipeline and a pressure sensor or detector 210 in the form of a pressure or acoustic transducer for detecting the pressure wave interaction signal. System 200 further includes an analysis and control module 220 for real time processing of the transient pressure wave interaction signal to analyse a region of interest of the pipeline. In one example, pipeline analysis system 200 may also control the operation of pressure wave generator 205.

This transient pressure wave may be generated in the fluid by any one of a number of techniques. In the example of a water transmission pipeline, a transient pressure wave may be generated at a device attached to, for example, an existing scour or fire plug air valve or offtake valve and then abruptly stopping the flow of water. This has the effect of progressively stopping or altering the flow of water along the pipe that had been previously established. This progressive stopping or alteration of the flow of water along the pipeline is equivalent to the generation of a transient pressure wave resulting in the propagation of a transient wavefront along the pipeline.

Other means to generate a transient pressure wave include, but are not limited to, inline valve closure devices, side discharge valves and piston chambers where an amount of fluid is drawn into a chamber containing a piston which is then operated. One example system for generating a transient pressure wave in fluid carried by the pipeline is described in International Patent Application No. PCT/AU2016/000246 (WO2017008100) titled "SYSTEM AND METHOD FOR GENERATION OF A PRESSURE SIGNAL", filed by the Applicant here, and whose entire contents are incorporated by reference in their entirety in the present disclosure.

As referred to above, a popular method for generating the transient pressure wave consists of generating a single step pulse created by the fast closure of a valve within the pipeline system or attached to the system. However, the typical useful bandwidth of this method may be less than 100 Hz, which means that, for some applications, a single pulse may not allow the extraction of enough information from the transient pressure wave interaction signal recorded for the pipeline system. Another transient pressure wave generation method consists of a pulse generation or sine wave stepping technique. The sine wave stepping technique uses a single frequency sinusoidal oscillatory signal as the input, and this frequency is adjusted to cover the range of frequencies required. In other examples, generating a transient pressure wave may include the generation of persistent signals known as pseudo-random binary sequences (PRBS). These signals consist of randomly spaced and equal magnitude pulses that are set to repeat periodically, and have a spectrum similar to that of a single input pulse. This generation method can use Maximum-Length Binary Sequences (MLBS) or Inverse Repeated Sequences (IRS).

In another example, the hydraulic noise of the system may be used to generate the transient pressure waves in the pipeline for analysis of the pipeline in accordance with the present disclosure. In other examples, customized and small amplitude pressure signals may be obtained from a piezoelectric actuator driven by a linear power amplifier to generate the transient pressure wave. In another example, controlled electrical sparks are employed to generate a vapour cavity that then collapses. An electrical spark surrounded by water causes the development of a localized vapour cavity, the collapse of which induces a transient pressure wave into the surrounding body of fluid having the characteristics of an extremely sharp pressure pulse. This typically results in high frequency pressure waves that can improve the incident signal bandwidth.

Figure 7:
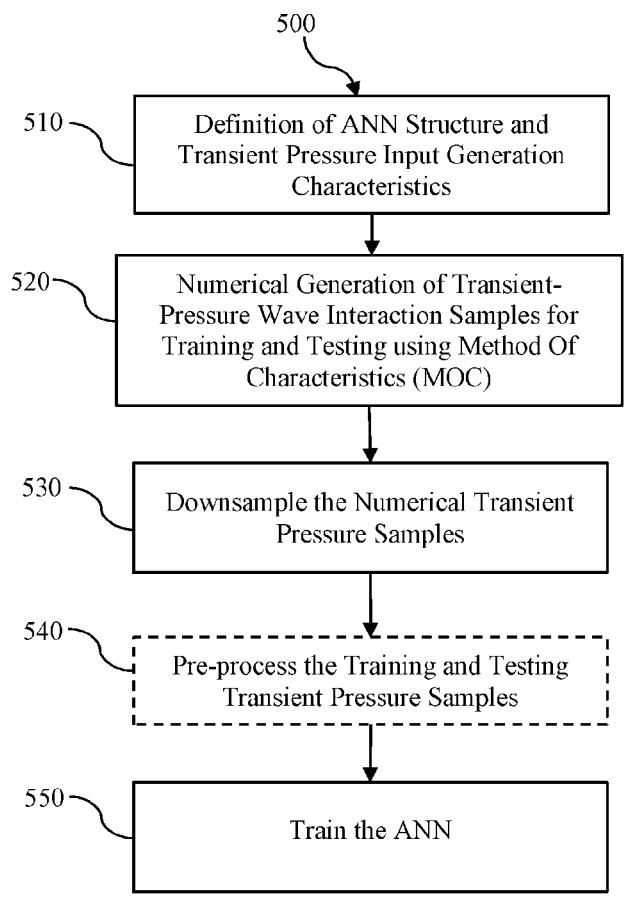
FIG. 7 is a flowchart of a method for training of an ANN to determine a hydraulic feature of a given type in accordance with an illustrative embodiment.

Considering all the available methods for generating a transient pressure wave, the methods and systems presented in this disclosure are applicable irrespective of the transient generation method chosen. The methods for training the artificial neural networks (ANN) as described below and with reference to FIG. 7 are of general application and may be adopted to using a generated pressure signal obtained by any of the above methods.

Referring back to FIG. 1, at step 120 a transient pressure wave interaction signal that is responsive to the transient pressure wave that has been generated is detected by in one example pressure sensor or detector 210. The time duration of this transient pressure wave interaction signal that is detected may be selected to cover the first complete cycle of reflections of the transient pressure wave (4 L/a) seconds where L is the length of region of interest of the pipeline and a is the transient wave speed in the fluid. In other examples shown, the time duration is selected to be between 2 L/a and 4 L/a seconds where again L is the length of region of interest of the pipeline and a is the transient wave speed in the fluid. In this illustrative embodiment, a pressure detector is employed in the form of a pressure or acoustic transducer in combination with a data acquisition capability.

In terms of the pressure sensor or detector 210, as would be appreciated, any type of high frequency response pressure detector, optical fibre sensor or transducer configured to record the transient pressure wave interaction signal of the pipeline following initiation of a transient pressure wave for a time duration as described above at a selected detection sampling rate or frequency typically between 2,000 Hz and 10,000 Hz may be used. The selection of a detection sampling frequency depends on the pipe wall properties of the pipeline, the wave speed of the fluid and the expected speed of occurrence of the anomaly.

In other examples, the detection sampling frequency for detecting the transient pressure wave interaction signal may be selected from the following frequency ranges, including, but not limited to, greater than 2 kHz, 2 kHz-5 kHz, 5 kHz-10 kHz, 2 kHz-3 kHz, 3 kHz-4 kHz, 4 kHz-5 kHz, 5 kHz-6 kHz, 6 kHz-7 kHz, 7 kHz-8 kHz, 8 kHz-9 kHz, 9 kHz-10 kHz, or greater than 10 kHz.

In this illustrative embodiment, analysis module 220 includes a customised data logging and analysis arrangement comprising a timing module 222 or other clock arrangement which may be GPS based, a data acquisition module 224, data processing module 226 and a remote communications module 228 to convey analysis results to a central location as required. As would be appreciated, the functionality of the various modules may be implemented primarily in hardware or in a combination of hardware and software or primarily in software.

As will be described below, a feature of analysis methods and systems of the present disclosure is that on-site analysis of pipeline condition may be carried out employing standard computer processing power such as would be found in a typical laptop computer. A non-limiting example of a suitable laptop computer that could be adopted would comprise 8 GB of RAM, an Intel™ processor and 250 GB of storage.

In one example, the pressure wave generator 205 is deployed remotely from the pressure detector 210 and analysis module 220. In this implementation, the pressure detector 210 and analysis module 220 may together form a "measurement station". In other example deployments, the pressure wave generator 205 may be co-located together with the pressure detector 210 and/or analysis module 220. As will be described below, other implementations may include multiple measurement stations which will detect the transient pressure wave interaction signal at different locations along the pipeline. At step 130, the pressure wave interaction signal is processed to analyse the region of interest of the pipelines.

Figure 3:
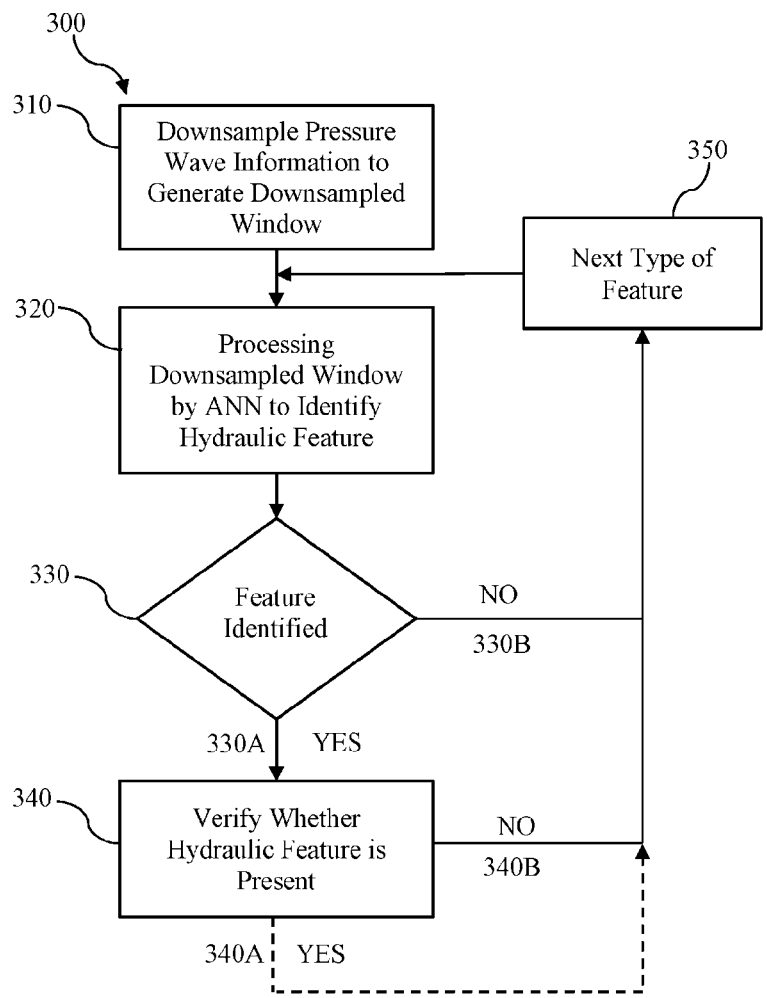
FIG. 3 is a flowchart of a method for processing the transient pressure wave interaction signal in accordance with an illustrative embodiment.

Referring now to FIG. 3, there is shown a flowchart of a method 300 for processing the transient pressure wave interaction signal according to an illustrative embodiment. At step 310, the transient pressure wave interaction signal which corresponds to a time dependent trace of the variation of pressure as a function of time as determined by a pressure sensor, typically sampled at a detection sampling frequency of at least 2,000 Hz, is downsampled in the time domain to an equivalent downsampled frequency to generate a downsampled time window of pressure information. As would be appreciated, depending on the pipeline setup, there may be some pre-processing or conditioning of the transient pressure wave interaction signal to address any background noise that may be present in the system.

In this example, the size or dimension of the downsampled time window of pressure information is chosen to match the input size or dimension of the discrete time series required for analysis by one or more trained ANNs as is explained in detail below. For the examples shown in this disclosure, the input size of the discrete time series corresponding to the pressure trace is 1219 points for a 2.5 second sample corresponding to an equivalent reduced downsampled sampling frequency of 488 Hz. As will be demonstrated below, adopting this reduced frequency for the downsampled sampling frequency greatly improves both the speed of training of the ANNs as well as the operation of the trained ANN on the input downsampled time window of pressure information allowing real time operation of the monitoring system.

In one example, the detected transient pressure wave interaction signal may be downsampled to an equivalent downsampled sampling frequency using a uniform selection of the n-th sample of the transient pressure wave interaction signal. The size of the resulting downsampled time window of pressure information in this example depends on the size of the original pressure trace and the selected n. This method of downsampling was adopted for the examples discussed in this disclosure.

In another example, the detected transient pressure wave interaction signal may be downsampled to an equivalent downsampled sampling frequency by averaging the values of an n-th block of sampled pressure values into one value of pressure. In both this downsampling technique and the technique above, the sampling frequency and the frequency used for the training of the ANNs need to be related by an integer n.

In yet another example, the detected transient pressure wave interaction signal may be downsampled to an equivalent downsampled sampling frequency by defining a new sample grid that matches the one used for the training of the ANN. In this downsampling technique, the pressure value in the new grid is calculated by interpolation (eg, linear, quadratic, cubic, Gaussian, nearest neighbour, etc). By using this technique, the downsampling frequency (eg, selecting every n-th sample or averaging over every n-th sample block or grouping) does not need to be explicitly related to the frequency used for training the ANN by an integer factor.

The final size of the downsampled pressure information and, therefore, the size of the input for the ANN, may be selected depending on the desired resolution for the identification of the features. As would be appreciated, there is a trade-off between the equivalent downsampled sampling frequency of the downsampled time window and the computational time required to develop the training and testing of the ANN. A larger input data set for the ANN will require in general more time to train, however, the testing time is not affected to the same extent.

In one example, the downsampled sampling frequency is selected from the following ranges, including, but not limited to: greater than 200 Hz, 200 Hz-250 Hz, 250 Hz-300 Hz, 300 Hz-350 Hz, 350 Hz-400 Hz, 400 Hz-450 Hz, 450 Hz-500 Hz, greater than 500 Hz, 500 Hz-550 Hz, 550 Hz-600 Hz, 600 Hz-650 Hz, 650 Hz-700 Hz, 700 Hz-750 Hz, 750 Hz-800 Hz, 800 Hz-850 Hz, 850 Hz-900 Hz, 900 Hz-950 Hz, 950 Hz-1 kHz, greater than 1 kHz, 1 kHz-1.05 kHz, 1.05 kHz-1.1 kHz, 1.1 kHz-1.15 kHz, 1.15 kHz-1.2 kHz, 1.2 kHz-1.25 kHz, 1.25 kHz-1.3 kHz, 1.3 kHz-1.35 kHz, 1.35 kHz-1.4 kHz, 1.4 Hz-1.45 kHz, 1.45 kHz-1.5 kHz, greater than 1.5 kHz, 1.5 kHz-1.55 kHz, 1.55 kHz-1.6 kHz, 1.6 kHz-1.65 kHz, 1.65 kHz-1.7 Hz, 1.7 kHz-1.75 kHz, 1.75 kHz-1.8 kHz, 1.8 kHz-1.85 Hz, 1.85 kHz-1.9 kHz, 1.9 kHz-1.95 kHz, 1.95 Hz-2 kHz, or greater than 2 kHz.

In other examples, the ratio of the downsampled sampling frequency to the detection sampling frequency is selected from the following ranges, including, but not limited to: 0.01-0.025, 0.025-0.05, 0.05-0.075, 0.075-0.1, 0.1-0.15, 0.15-0.2, 0.2-0.25 less than 0.25, 0.25-0.3, 0.3-0.35, 0.35-0.4, 0.4-0.45, 0.45-0.50, less than 0.5, 0.5-0.55, 0.55-0.6, 0.6-0.65, 0.65-0.7, 0.7-0.75, less than 0.75, 0.75-0.8, 0.8-0.85, 0.85-0.9 or 0.9-0.95.

At step 320, the downsampled pressure information is processed by an ANN trained to determine or identify the presence of a hydraulic feature of a first type and determine the associated hydraulic characteristics pertaining to this type of hydraulic feature. At step 330, in many circumstances the ANN will indicate that no hydraulic feature of the first type is present in the downsampled time window of pressure information (ie, NO at 330B) and the method progresses to select a hydraulic feature of a second type at step 350 and an associated ANN to once again process the downsampled time window of pressure information.

Where the ANN has determined that a hydraulic feature of the first type has occurred (ie, YES at 330A) then at step 340 a verification step is carried out to verify where the hydraulic feature of the first type has occurred in the region of interest of the pipeline. As indicated in FIG. 3, where the verification fails (ie, NO at 340B) the method progresses to select a hydraulic feature of a second type at step 350 for the process to be repeated. In the case, where the verification is successful, depending on the type of feature, the method may progress to determine whether hydraulic features of other types are also present in the pipeline (ie, YES at 340A).

In one example, the verification step 330 following the identification of a hydraulic feature of a selected type has been determined may involve a check of whether the determined associated hydraulic feature characteristics of the selected type are physically possible. As an example, the ANN may determine that the location of a particular hydraulic feature is outside the end limits of the pipeline.

Figure 4:
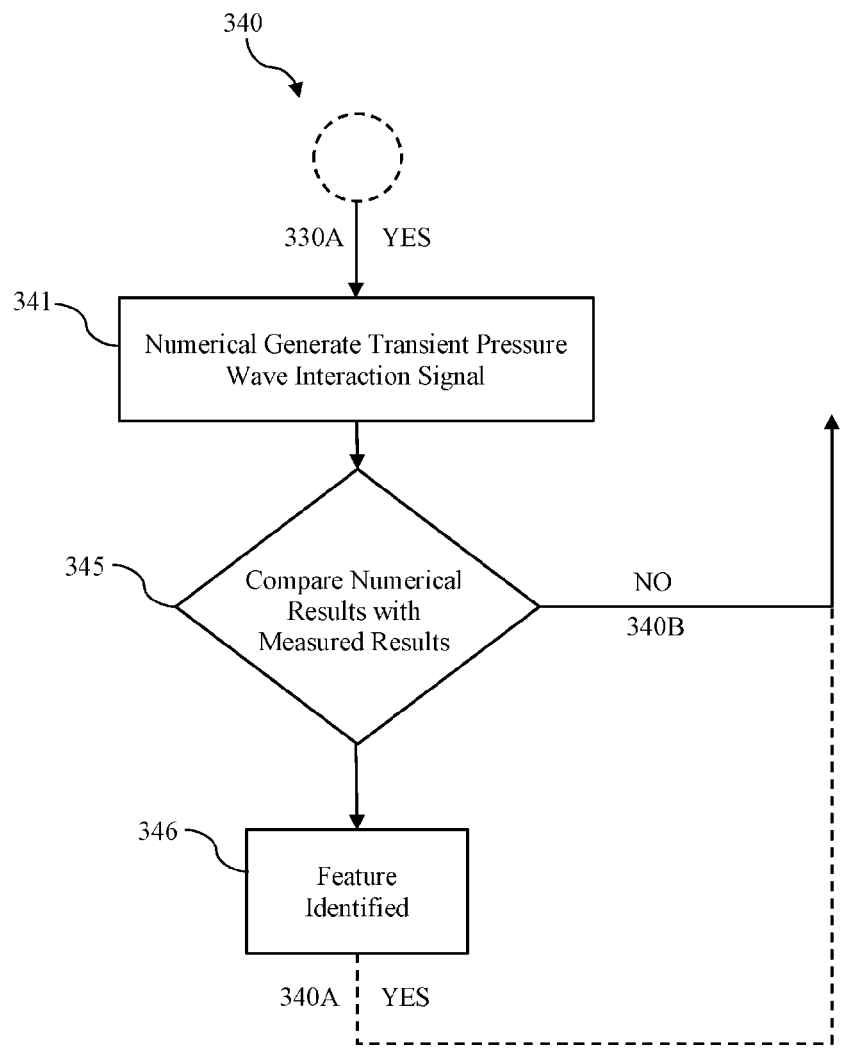
FIG. 4 is a flowchart of a method for verifying the presence of a hydraulic feature in accordance with an illustrative embodiment.

Referring now to FIG. 4, there is shown a flowchart of a method 340 for verifying whether a hydraulic feature of the selected type that has been identified by the ANN occurs in the region of interest of the pipeline according to an illustrative method. At 330A the input is a hydraulic feature and its associated hydraulic characteristics that characterise the hydraulic feature. From this information, a numerically generated transient pressure wave interaction signal is calculated based on a hydrodynamic model of the pipeline such as a hydraulic water hammer simulation. At step 345, the numerically generated transient pressure wave interaction signal is compared with the detected or measured transient pressure wave interaction signal to verify at step 346 that the hydraulic feature that has been identified occurs in the region of interest (eg, see process pathways 340A corresponding to YES—a hydraulic feature of the selected type has been verified and 340B corresponding to NO—a hydraulic feature of the selected type has not been verified).

In one example, the comparison is determined by calculating the differences between the measured pressure value and the numerically generated pressure value at the corresponding time value for all time values in the time window and then determining the root mean square (RMS) summation of these differences. This comparison measure may then be compared with a comparison threshold.

In another example, a downsampled time window of pressure information based on the numerically generated pressure information is compared to the downsampled time window of the measured pressure information in determining the comparison measure. This comparison measure could include the computation of the absolute error between the two windows of pressure, the value of the maximum error or any other comparison measure. In another example embodiment, the frequency distribution of errors is used to compare the downsampled time window of numerically generated pressure information with the measured pressure information to determine if the result provided by the ANN is accurate.

In this manner, an analysis method in accordance with the present disclosure is able to step through the different types of hydraulic features that may be of concern by deploying ANNs trained on the selected hydraulic feature types. As would be appreciated, for some pipeline systems it may be known that only one or two hydraulic features may be of interest. In other pipeline systems where no records exist, then a large range of potential hydraulic feature types, eg, topological features, can be tested to analyse the condition of the pipeline.

As the pipeline condition analysis methods of the present disclosure employ ANNs it is instructive to provide a general review of this topic.

Figure 5:
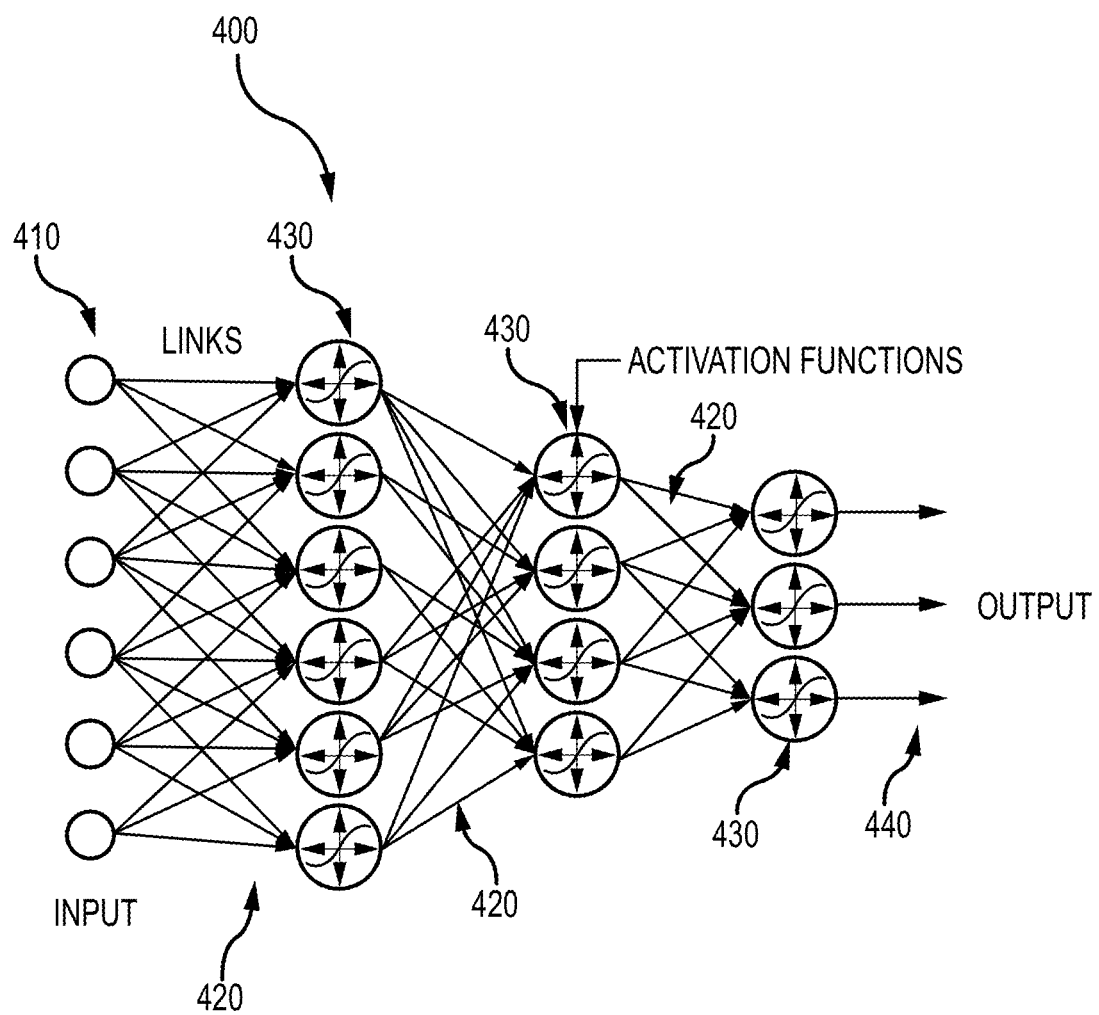
FIG. 5 is a system overview diagram of a generalised artificial neural network (ANN)

Referring now to FIG. 5, there is shown is a system overview diagram of a generalised ANN 400, where it can be seen that the ANN implements a mathematical function (model) from n inputs 410 to m outputs 440 where this function is represented by a mathematical graph of connections and nodes linking the inputs 410 to the outputs 440.

In this example, the inputs 410 to the generalised ANN 400 are a vector or series of numerical values where these values are transmitted via the links 420 of the graph to activation functions 430. All links 420 in the graph have an associated weight which is used to scale the value that traverses the link 420. Each activation function 430 transforms the sum of the weighted values it receives to an output value that is then propagated through the network. In this manner, the input values 410 are transformed by traversing the weighted links 420 and the activation functions 430 in the graph until they reach the output values 440.

ANNs are trained by a process that modifies the weight associated with each link 420 in the generalised ANN 400 to improve the accuracy of the model represented by the ANN 400. In theory, with modification of weights alone it is possible for a network of at least three layers as depicted in FIG. 5, with enough links 420 to approximate any arbitrary function. However, the extent to which this theoretical position is achieved will in practice be determined by the interaction between the network architecture and the training process.

The ANN is trained by a process of mathematical regression where a gradient search algorithm is used to adjust the weights in the generalised ANN 400 to minimise the error between the actual outputs 440 of the network and the desired output. To be useful in the desired application domain, a network will approximate the required function to a high level of accuracy on both the data it was trained with and any new test data that it is presented with. As would be appreciated, the design of any ANN presents the model designer with a very broad range of design decisions relating to topology, scale, activation functions, regularisation strategies and training methodology. An important consideration is that the ANN should capture the behaviour of the desired function without having too many weights (parameters) which can then result in the over-fitting of the data used in the training process.

As will be described below, a feature of the analysis methods and systems of the present disclosure is that on-site, fast and accurate analysis of pipeline condition may be carried out employing standard computer processing power such as would be possessed by a standard laptop computer. As referred to above, each measurement station consisting of a pressure detector and associated data processor is configured to record pressure information at a sampling rate between 2,000 Hz and 10,000 Hz.

Figure 6:
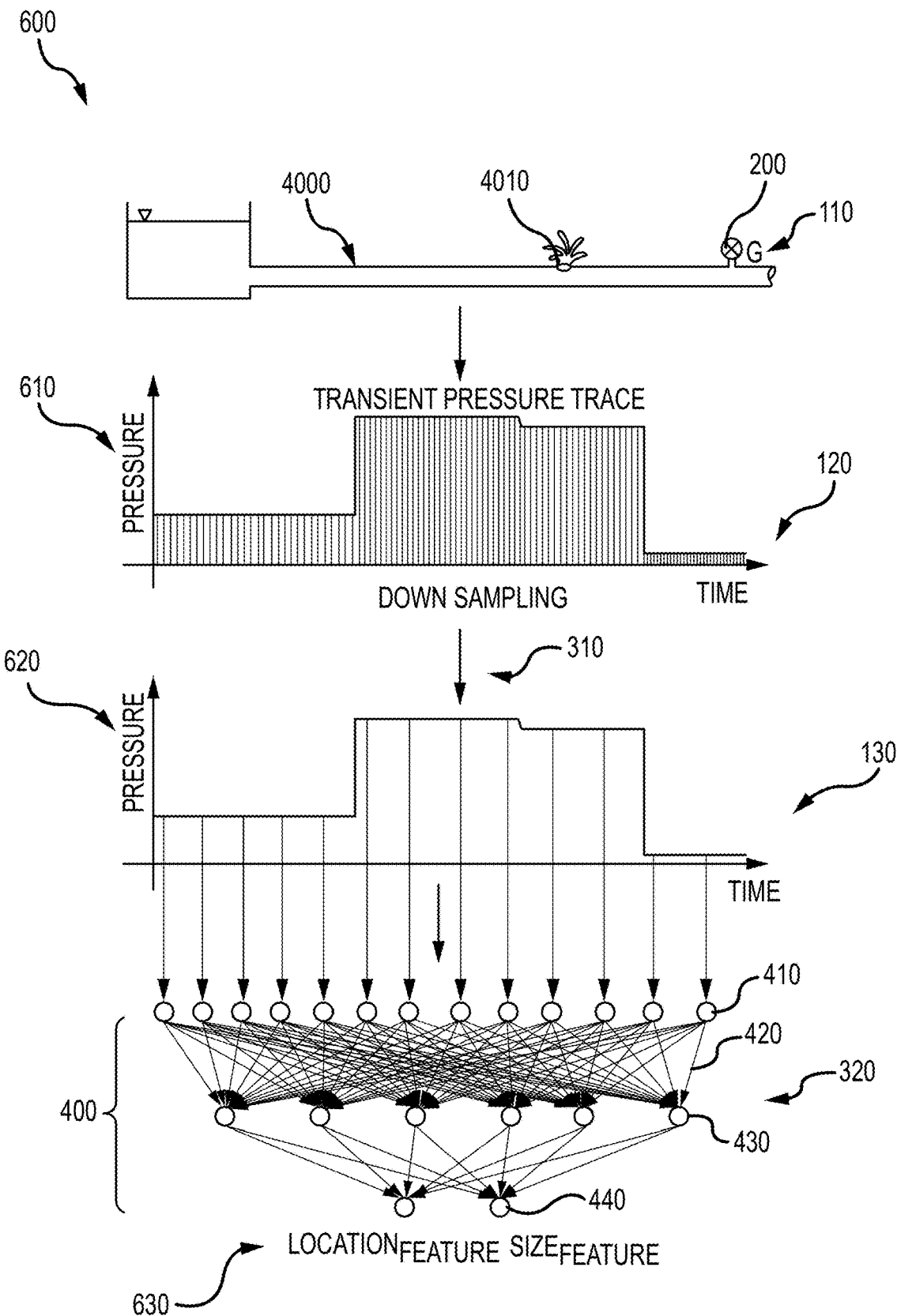
FIG. 6 is a data flow diagram showing figuratively the application of an ANN for the real time analysis of a pipeline in accordance with an illustrative embodiment.

Referring now to FIG. 6, there is shown a data flow diagram 600 showing figuratively the application of an ANN for the real time analysis of a pipeline 4000 as has been discussed above that employs an induced transient pressure wave and a series of ANNs to identify, locate and characterize a range of different hydraulic features of the pipleine.

Referring also to FIGS. 1 to 5, initially a transient pressure wave is generated in the fluid carried along by the pipeline 4000 which as depicted in this case includes a hydraulic feature in the form of a leak 4010 having associated hydraulic feature characteristics corresponding to the location of the leak and the size of the leak. In this example, the transient pressure wave is generated (see step 110 in FIG. 1) by a pressure wave generator forming part of generator and analysis system 200 located on the pipeline at location G as indicated.

In plot 610 there is shown the transient pressure wave interaction signal which occurs as a result of the generated transient pressure wave and which is detected (see step 120 in FIG. 1) by a pressure sensor or detector. As can be seen, the pressure wave interaction signal is essentially continuous being sampled at a rate ranging from 2000 Hz to 10,000 Hz. Following detection, the pressure wave interaction signal is processed (see step 130 in FIG. 1) in order to analyse the region of interest of the pipeline. In this example, the transient pressure wave interaction signal is downsampled (see step 310 in FIG. 3) to generate a downsampled time window of pressure information which is depicted in the plot 620. In this example, the time duration of the pressure wave interaction signal and the downsampled time window of pressure information is at least 2 L/a seconds where L is the length of the region of interest to ensure that the whole region of interest is being analysed.

The downsampled time window of pressure information then forms an input vector 410 for an ANN with the general structure 400. This ANN processes the input vector 410 corresponding to a series of pressure values to provide outputs 440 which in this illustrative embodiment corresponds to confirmation of the occurrence or presence of the hydraulic feature and associated hydraulic feature characteristics 630 of the type that the ANN has been trained to determine in the downsampled time window of pressure information. In this example, the associated hydraulic characteristics may be described generically as the location and size of the hydraulic feature which has been detected in the region of interest of the pipeline.

As has been discussed above, successive ANNs may be applied to process the downsampled time window of pressure information, where each ANN has been trained to identify a hydraulic feature of a selected type and to determine their associated characteristics. For each ANN there will be a determination of whether the tested for type of hydraulic feature is present (ie, identify the selected hydraulic feature type) and if it is present, the ANN will also determine the associated hydraulic characteristics of the selected hydraulic feature type. In the case where there has been a determination that the hydraulic feature is present, then this may be verified by numerically generating a pressure wave interaction signal assuming the presence of the hydraulic feature and its associated hydraulic characteristics which can then be compared with the measured pressure wave interaction signal.

Referring now to FIG. 7, there is a flowchart of a method 500 for training of an ANN to determine a hydraulic feature of a given or selected type according to an illustrative embodiment.

By way of overview, at step 510, the characteristics of the ANN are defined including the ANN architecture and the input generation parameters such as the number of numerical samples for training and testing. Additionally, the spatial distribution or sampling characteristics of the pressure information values along the pipeline are defined. At this stage a hydraulic feature type and an associated range of values of the associate hydraulic feature characteristics are selected that cover the possible range of physical situations that are being analysed.

At step 520, training samples and optionally testing samples are generated numerically by a computational hydrodynamic model of the pipeline such as a hydraulic water hammer simulation model employing in this example the Method of Characteristics (MOC). As will be discussed below, this method transforms the two partial differential equations that govern the behaviour of unsteady flow into four ordinary differential equations in order to obtain the variation of flow and head in a pipeline in time. These samples correspond to respective pressure wave interaction signals that have been numerically generated corresponding to the range of values of the hydraulic feature characteristics.

A number of other numerical methods for generating the transient pressure wave interaction data could also be used. Examples of these methods, in the time domain, include Skalak's model, or the Lagrangian method. In addition, any existing numerical method for solving partial differential hyperbolic equations can be applied to the method and system of the present disclosure. Other examples for generating the transient pressure data include implicit methods (which include the transformation of the partial differential equations to make them more flexible) or methods in the frequency domain such as the transfer matrix method or the Laplace domain admittance matrix.

At step 530, once the respective pressure wave interaction signals are numerically generated, they are then downsampled to generate a downsampled time window of pressure information whose size matches the input size or dimension of the ANN.

At optional step 540, in one embodiment the downsampled time windows of pressure information undergo a further non-dimensional transformation which allows the ANN to determine results for any pipeline regardless of its dimensions. In general, to obtain a non-dimensional form of the pressure information, the following equation is used:

$$P^* = \frac{P - P_0}{\Delta P_i}$$

where P* is the non-dimensional pressure, $P_0$ is the initial steady state pressure at the measurement point and $\Delta P_i$ is the initial pressure increase after the generation of any transient pressure wave associated with the anomaly.

The initial steady state pressure and the initial pressure increase may be easily extracted either from the numerically generated pressure data or from the pressure measurements and they do not require any extra information about the pipeline system. On the other hand, to transform the time to a non-dimensional form, the following equation is used:

$$t^* = \frac{t}{2L/a}$$

where t* is the non-dimensional time and 2 L/a corresponds to the time that it takes for the generated transient pressure wave to travel to the reservoir connected to the pipeline and back to the valve. L is the length of the pipe and a is the wave speed of the fluid in that pipeline.

These two values of L and a may not be known. However, if this information is not available, the non-dimensional transformation can be obtained directly from the measured transient pressure data since the reflection from the reservoir is always evident in the pressure signal. In a similar way, to complete the transformation, the size of feature can be non-dimensionalised.

Figure 19:
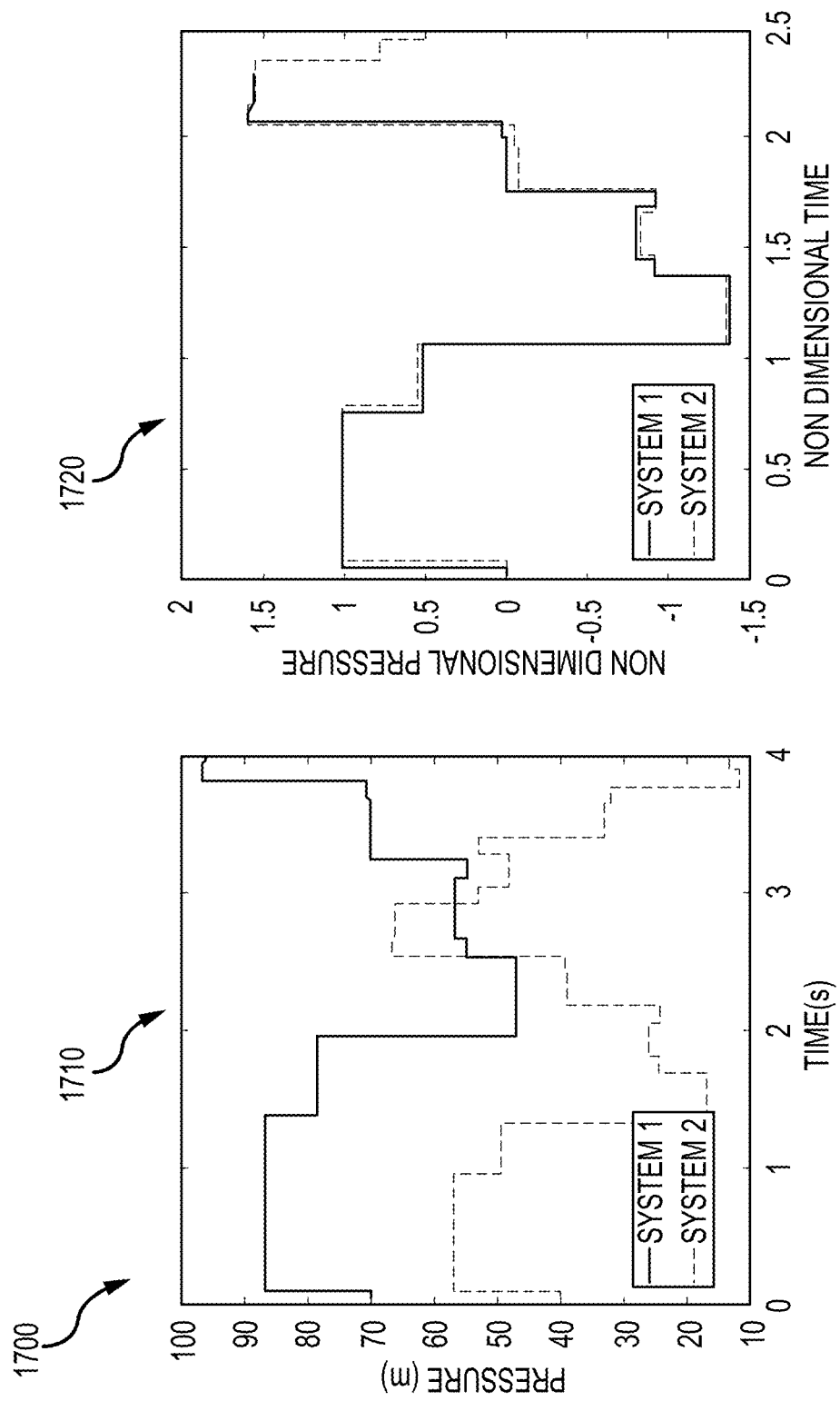
FIG. 19 is a plot of an example of the non dimensional transformation of two pressure interaction signals of different pipelines and a comparison of the same signals following a non dimensional transformation.

Referring now to FIG. 19, there is shown an example of two transient pressure signals before and after the non-dimensional transformation which correspond to two different pipelines. In both examples the pipes series junction location was selected to be at the same point along the pipeline (30% of the total length from the reservoir) but the remaining characteristics of the system are different. In this example it is evident how the two different transient pressure interaction signals 1710, can be transformed into an equivalent non-dimensional signal 1720 that can be tested in any of the ANNs included in the methods and systems proposed in the present disclosure. If this non-dimensional transformation is applied to the training data, the ANN is capable of predicting results for any pipeline. However, this same transformation can be used to test an ANN that has been trained for a dimensional system. A testing sample from a different system can be transformed to a non-dimensional form and then converted into an equivalent system for the testing of the ANN.

In one example, a subset of the downsampled numerically generated time windows is used for training the ANN while another subset is used for testing the ANN (see below). In one example, half of the numerically generated pressure information is selected for the training process. As an example, if pressure information corresponding to 5,000 locations of a hydraulic feature are numerically generated then only 2,500 locations are used for training of the ANN.

In one example, pre-processing the training data includes randomization of the training data set so that the locations of the hydraulic features, as an example, are not in order. Afterwards, the input data for training the ANN (including the numerically generated transient pressure trace and the location and hydraulics characteristic of the feature) undergoes a normalization process forming a Gaussian distribution centred at 0.0 with a standard deviation of 1.0. This numerical transform used to obtain this distribution is then saved in order to transform the output values of the testing stage to the original scale.

At step 550 in FIG. 7, the ANN is trained to determine the selected hydraulic feature type based on the downsampled time windows of pressure information and the associated values for the hydraulic feature characteristics that generated the original transient pressure wave interaction signal. In one example, the weights 420 in the ANN 400 are defined based on these input data using stochastic gradient descent algorithms. These algorithms adjust weights in the network to minimize the loss between predicted values and target values. Stochastic gradient descent algorithms work by following the gradients derived from a subsample of training data.

Illustrative examples of the method and system of the present disclosure are now described to explain its functioning, accuracy and performance. In all of the examples presented below, the generation of the transient pressure wave is at one end of the pipeline and for most of the cases, the pressure transducer is located at the same point. However, the method and system described are equally applicable to cases where the transient pressure wave is generated using any of the methods described above (eg, see step 110 of FIG. 1) and/or the pressure is measured at different points along the pipeline (eg, see step 120 of FIG. 1).

The present Applicant has discovered that the numerically generated transient pressure wave interaction signals 120 used to train the ANN may be downsampled to dramatically reduce the size of the input data required for training without compromising the training results of the ANN. Correspondingly, the measured transient pressure wave interaction system in the analysis system may also be downsampled to match the input dimension or size of the corresponding ANN. This downsampling allows a series of ANNs, each trained to determine or identify different types of hydraulic features (and associated hydraulic feature characteristics) to be applied one after the other to provide results on-site and accurately as each ANN is operating on a relatively small input data size. As would be appreciated, and as compared to prior art systems, this allows hydraulic features in a pipeline system to be analysed in real time and on-site following generation of the transient pressure wave in the pipeline.

Figure 8:
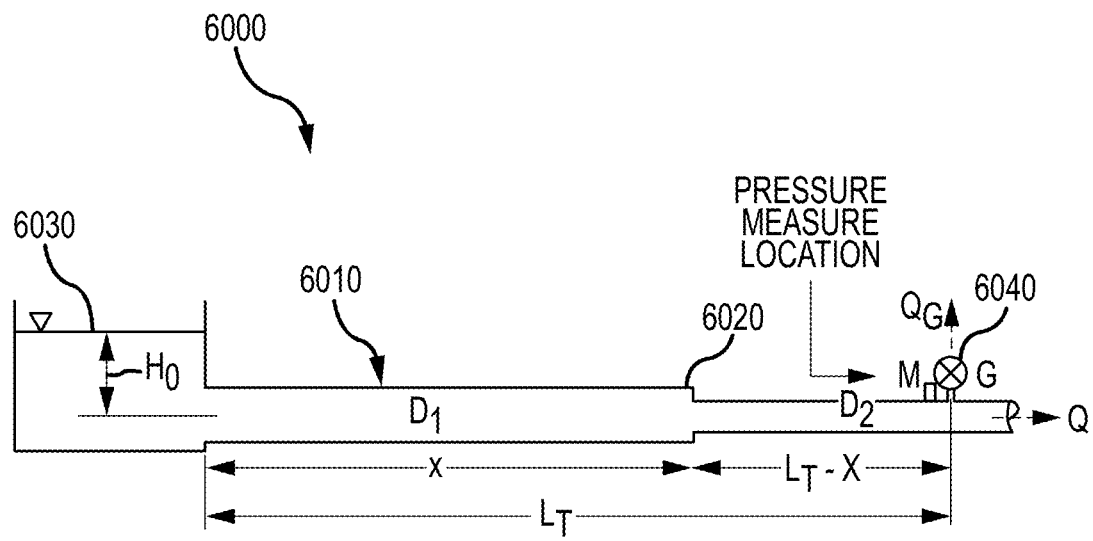
FIG. 8 is a pipeline model for training the ANN to determine the hydraulic feature type of a pipe series junction in accordance with an illustrative embodiment.

Referring now to FIG. 8, there is shown an example of a pipeline model 6000 for training the ANN to determine the hydraulic feature type of a pipes series junction according to an illustrative embodiment. In this example, a pipe series junction 6020 in a single pipeline 6010 with two different diameters is shown. The pipeline 6010 is connected at the upstream end to a reservoir 6030 with a fixed head $H_0$ and at the downstream end to a side discharge valve 6040 where the transient pressure wave is generated with a sharp valve closure. The length of the pipeline is fixed ($L_T$), the length of the upstream segment of the pipe of diameter $D_1$ is defined as x and the length of the downstream segment of diameter $D_2$ is then ($L_T$-x). In this example, steady state conditions of the pipeline system 6000 are fixed for all the transient simulations. An initial head and an initial velocity in the pipeline (at the valve) were defined as $H_0$=70 m and $V_0$=0.15 m/s respectively. Only steady state friction was considered by using the Darcy-Weisbach friction factor f with a pipeline roughness height of ε=0.01 mm. The total length of the pipe was assumed to be $L_T$=1000 m.

In this example, determination of the pipe series junction by the trained ANN includes the detection of the existence of the junction and determination of associated hydraulic feature characteristics comprising the location of the pipe series junction (by determining the length of the upstream pipe segment) and the combination of different diameter sizes on either side of the junction in the pipeline.

To train the ANN, input training data included simulations of ten different combinations of diameter sizes on either side of the junction. These combinations were defined according to the Australian/New Zealand standard for ductile iron pipes with cement mortar lining and are presented in Table 1. Different wall and cement mortar lining thicknesses were considered for the different diameters. In the ten combinations of diameters, five corresponded to flow going from a larger to a smaller diameter ($D_1 > D_2$) while five correspond to flow going from a smaller to a larger diameter ($D_1 < D_2$). The period of time used to generate the numerical pressure traces was 2.5 s, which corresponds to more than the first period of reflections 2 L/a.

TABLE 1

Nominal diameters combinations for detection of pipe series junctions (Standards Australia 2014).

| Combination | $D_1/D_2$ | $D_1$ (mm) | $D_2$ (mm) |
|---|---|---|---|
| 1 | 1.25 | 750 | 600 |
| 2 | 1.50 | 750 | 500 |
| 3 | 1.2 | 600 | 500 |
| 4 | 1.33 | 600 | 450 |
| 5 | 1.11 | 500 | 450 |
| 6 | 0.9 | 450 | 500 |
| 7 | 0.75 | 450 | 600 |
| 8 | 0.83 | 500 | 600 |
| 9 | 0.67 | 500 | 750 |
| 10 | 0.80 | 600 | 750 |

Referring back to FIG. 7, generation of the input data (transient pressure wave interaction signals measured at the side discharge valve after its closure) to train and test the ANN is accomplished by running multiple numerical simulations (an example of step 520) of the pipeline series junction system using a conventional MOC. In this example, for each of the diameter combinations, the length of the upstream segment of the pipeline was changed along the complete length of the pipeline to simulate different locations of the junction. The number of generated locations, selection of these locations, the time step and length of each reach used in the MOC numerical simulations are included in determining the training regime for the ANN (see step 510) and are described in detail below for this example.

Figure 9:
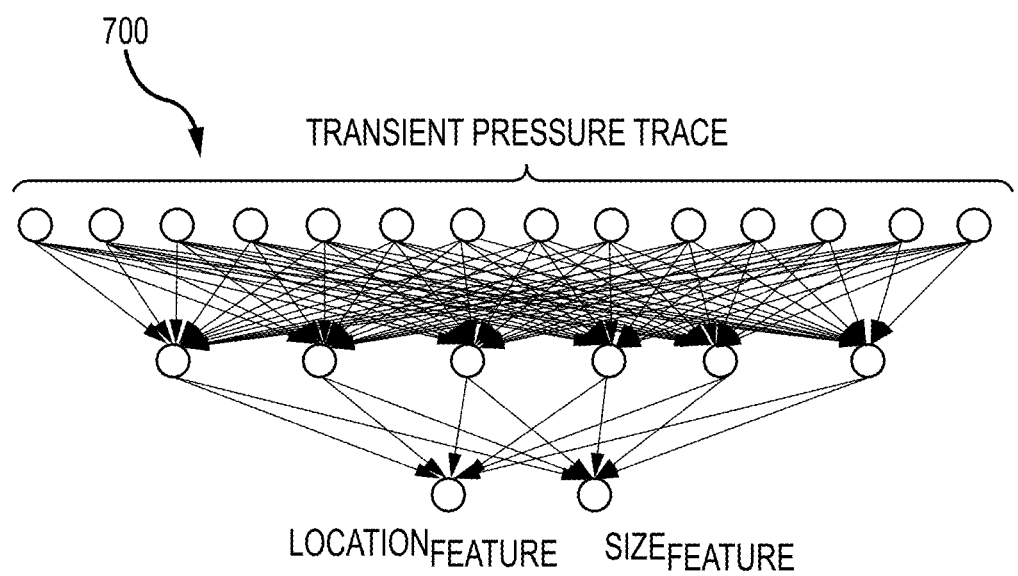
FIG. 9 is a system overview diagram of a Dense Network architecture for the ANN in accordance with an illustrative embodiment.

As would be appreciated, as part of the training process of an ANN 500 at step 510, there are a number of different types of ANNs that can be selected for the methods and systems discussed in this disclosure. As an example, two are presented here. Referring now to FIG. 9, there is shown a system overview diagram of a Dense Network architecture 700 for the ANN. In this example, each neuron in a layer is connected to every neuron in the subsequent layer. Dense Networks embed a lot of information in their weights and are able to express quite complex functions. However, the large number of weights in the Dense Network ANN architecture carries with it a risk that the ANN will over-fit the training data and not generalise adequately to new data.

Figure 10:
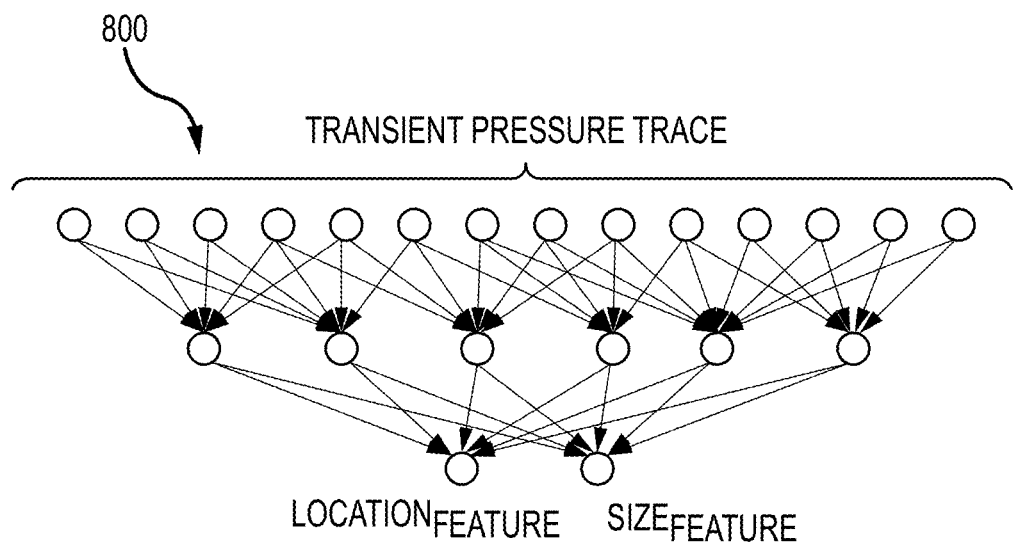
FIG. 10 is a system overview diagram of a 1D Convolutional architecture for the ANN in accordance with an illustrative embodiment.

Referring now to FIG. 10, there is shown a system overview diagram of a 1D Convolutional Network 800 for the ANN. In this example, each neuron in a layer is linked to neurons in the corresponding neighbourhood in the subsequent layer. Convolutional Networks capture local interactions between data points and can work well in applications where there is potential to exploit spatial locality of features in input data. For a given number of input nodes, Convolutional Networks have many less weights and thus are less prone to over-fitting.

Referring back to FIG. 8, for the pipeline model 6000 where the type of hydraulic feature being recognised is a pipe series junction 6020 in the pipeline 6010, both the Dense Network and 1D Convolutional Network architectures were assessed for suitability for determining a hydraulic feature type in the form of a pipe series junction. In this assessment, a pipe series junction 6020 was randomly generated within each interval of 0.1 metres along the entire 1000 metres of pipeline and the resulting transient pressure wave interaction signal determined by numerical simulation based on the MOC and then downsampled to 1219 time steps. This process was repeated for 10,000 different randomly selected pipe series junction locations. Half of the resultant data was used for training both the Dense Network and 1D Convolutional Network and the other half of the data was then used to test the performance of the different ANN architectures.

Figure 11:
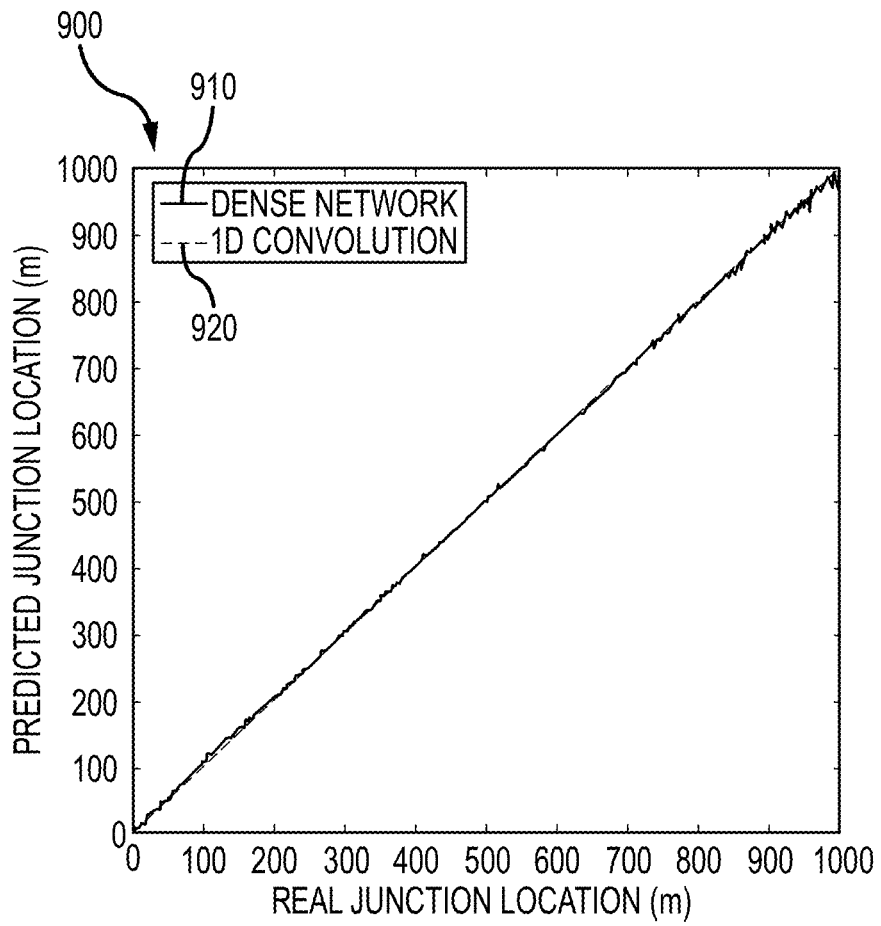
FIG. 11 is a scatter plot of the predicted pipe series junction location compared to the actual pipe series junction location comparing the Dense Network and 1D Convolutional ANN architectures.
Figure 12:
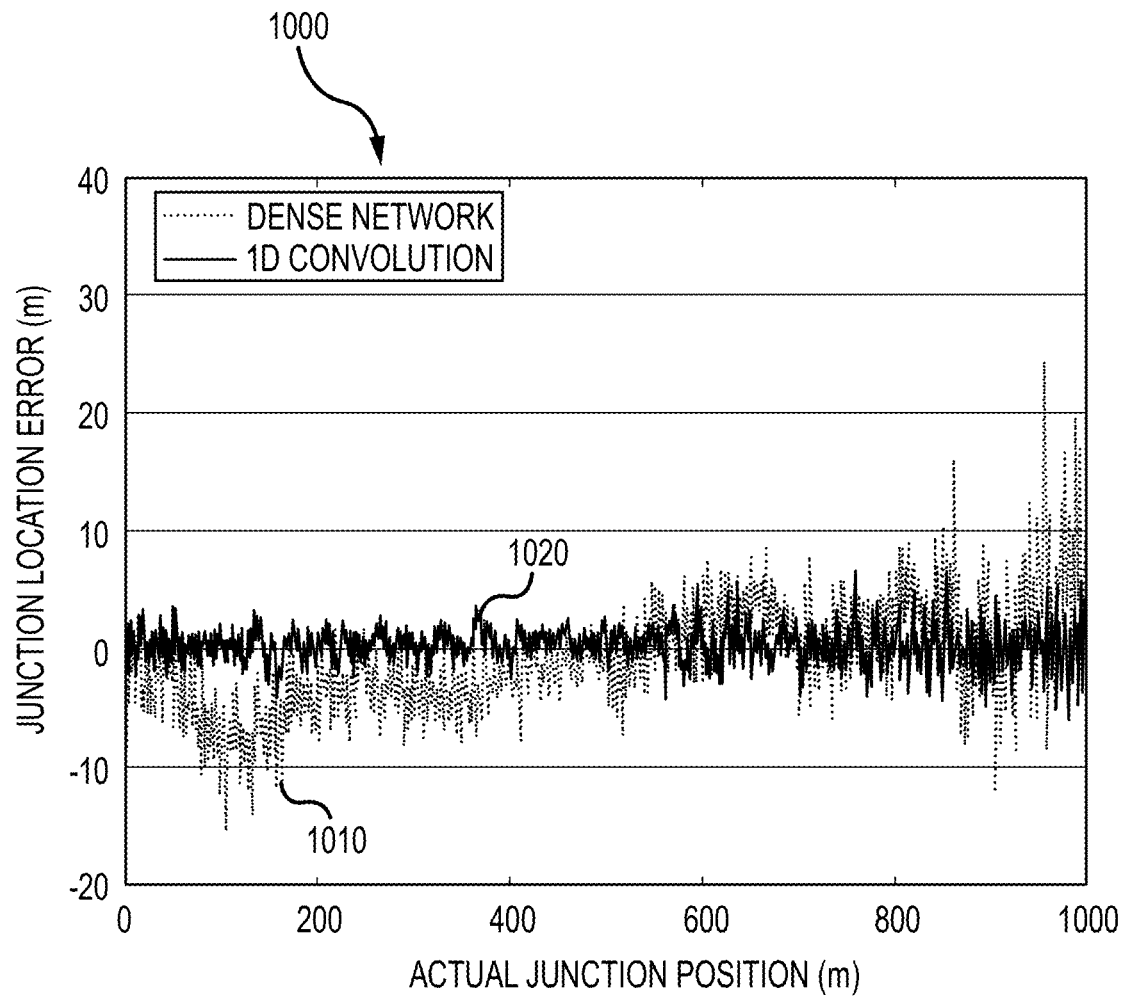
FIG. 12 is a graph of the location error as function of pipe series junction location on the pipe comparing the Dense Network and 1D Convolutional ANN architectures.

Referring now to FIG. 11, there is shown a scatter plot 900 of the predicted pipe series junction location versus the actual pipe series junction location in metres for both the Dense Network 910 and 1D Convolutional 920 architectures. In FIG. 12, there is shown a graph 1000 of the computed pipe series junction location error as a function of the actual junction location for both the Dense Network 1010 and 1D Convolutional 1020 architectures.

By inspection of FIG. 11, it is evident that in general the results in predictions of the location of the pipe series junction of the two ANN architectures both perform equally well. It is noticeable that at the end of the pipe, close to the side discharge valve where the transient pressure wave is generated, a larger discrepancy between the actual and the predicted pipe series junction locations is found. However, overall there appears to be little significant difference that would result in one architecture being preferred over the other. An alternative way of comparing the effectiveness of each ANN is now considered.

In FIG. 12, the Error in the location of the pipe series junction (with a fixed combination of diameters on either side of the junction) is shown for various locations along the whole pipeline. Error is determined in accordance with the equation Error=$x_R - x_P$, where $x_R$ is the actual location of the pipe series junction for a particular case and $x_P$ is the predicted location which comes from the indicated ANN architecture.

As can be seen from inspection of FIG. 12, the 1D Convolutional Network performs better for predicting the location of the pipe series junction as compared to the Dense Network architecture. For the testing conducted here, the Dense Network architecture had a maximum error of 31.7 metres and an average error of 3.43 metres along the whole pipeline. On the other hand, the ID Convolutional Network had a maximum error of 6.45 metres and an average error of 1.14 metres. In addition, as it can be seen in the FIG. 12, results from the 1D Convolutional Network involves less high frequency behaviour proximate to the end of the pipe. Based on these results, a 1D Convolutional Network architecture was preferred for the ANN for determining hydraulic features in the present disclosure.

In one example, the 1-D Convolutional Network architecture or configuration comprised a network employing a Leaky Rectified Linear Unit (Leaky ReLU) as an activation function with three convolutional layers of size 1200, 600 and 300, each layer having 10 filters and a three dense layer of size 21, 9, and 2 (or 3 depending on the analysed hydraulic feature type). With this configuration, 32,409 weights were trained.

As would be appreciated, it is expected that depending on the pipeline model, the specific hydraulic feature types being tested for and the setting of the transient generation and the pressure measurement points, other types of ANN architectures may be indicated as suitable for adoption. When multiple pressure transducers are used, the ANN architecture design may be varied to accommodate the extra data in two primary ways. First, additional input channels may be added to a 1D Convolutional Network to cater for the extra pressure traces. Additional filters can then be added to subsequent convolutional layers to help process these additional input traces. In another example, a 2D Convolutional Network employs an input layer with the second dimension of input dedicated to the different signal pressure traces. This second dimension can also be reflected in subsequent layers of the network.

Depending on the configuration of the field implementations, the training data for the ANN may require the position of the pressure wave generator and both the number and location of the pressure sensors to be also varied to train the ANN. Such variations require further inputs such as the positions of the pressure wave generator and the sensor, be integrated into the network as additional scalar inputs. Such integration can be done by connecting these inputs to the first dense layer of the network to be trained or by connecting them to the last layer of filters in the convolutional stage of the network.

One of the parameters for training an ANN to recognise and analyse features is the size of the training data set in terms of the number of training samples or sample size employed for training the ANN. Referring back to FIG. 7, as would be appreciated, the selection of this parameter, as part of step 510, is directly involved with the computational effort required to numerically generate the input transient data based on the simulation of the transient pressure wave interaction and subsequently the training of the ANN to determine the type of hydraulic feature within the pipeline that is being determined.

In this disclosure directed to the analysing a pipeline, the transient pressure sample size is generally related to the spatial resolution of the feature such as the location of a junction between two pipe diameter sizes. A larger sample size will imply that in the training data the spacing of the locations of the feature (either uniformly or randomly) can be reduced. In addition, the spacing of the location of the feature will also affect the time resolution required for the numerical modelling of the transient pressure wave interaction signal arising as a result of the interaction of the generated transient pressure wave and the hydraulic feature.

In this illustrative example, where the hydraulic feature is a pipes series junction and an associated hydraulic feature characteristic is the location of the pipe series junction, numerical simulations were carried out to determine an appropriate training sample size covering variation of the hydraulic feature characteristic.

In order to evaluate the performance of each training sample size, a validation set of data of size 100 was used to compare the error in the location of the feature, which in this example is the pipe series junction location. These 100 locations were generated randomly along the 1000 metres length of pipe and the performance was computed in accordance with the equation below:

$$E = \frac{1}{2n_{cv}} \sum_{1}^{n_{cv}} (x_R - x_P)^2$$

where E is the square error function in m², $x_R$ is the actual location of the feature for a particular case and $x_p$ is the predicted location of the feature from the ANN, both in metres. $n_{cv}$ is the size of the cross validation data set. To generate the input data for this analysis, locations were selected randomly and pressure interaction signals were downsampled to 1219 time steps as described above.

Figure 13:
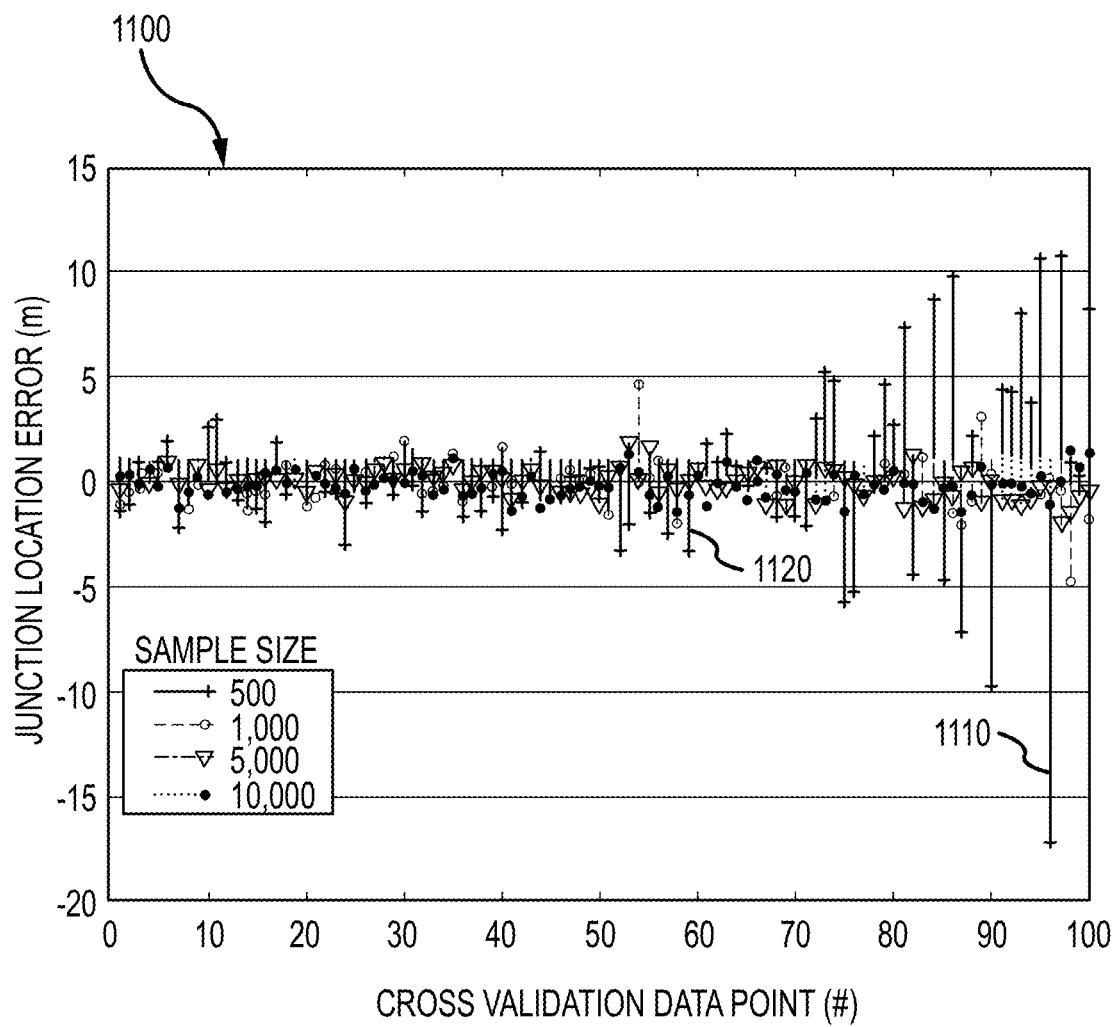
FIG. 13 is a plot of the pipe series junction location error for different input training data sample sizes.

Referring now to FIG. 13, there is shown a plot 1100 of the pipes series junction location error in the validation data set of different ANNs trained with input data sample sizes of 500, 1,000, 5,000 and 10,000 locations along the pipeline. For a 1000 metre pipe of this example, this implies that the location of the pipe series junction was changed every 2, 1, 0.2 and 0.1 metres respectively in generating the training data sets. By inspection of FIG. 13 it can be seen that the results predicted for the ANN trained with an input sample size of 500 are not satisfactory and for pipe series junction locations near the closed valve (ie, to the right of FIG. 13 (for reference see FIG. 8)), the error 1110 reached almost 20 metres in some of the cases. In addition, adopting a sample size of 1,000 resulted in some errors 1120 close to a magnitude of 5 metres.

Figure 14:
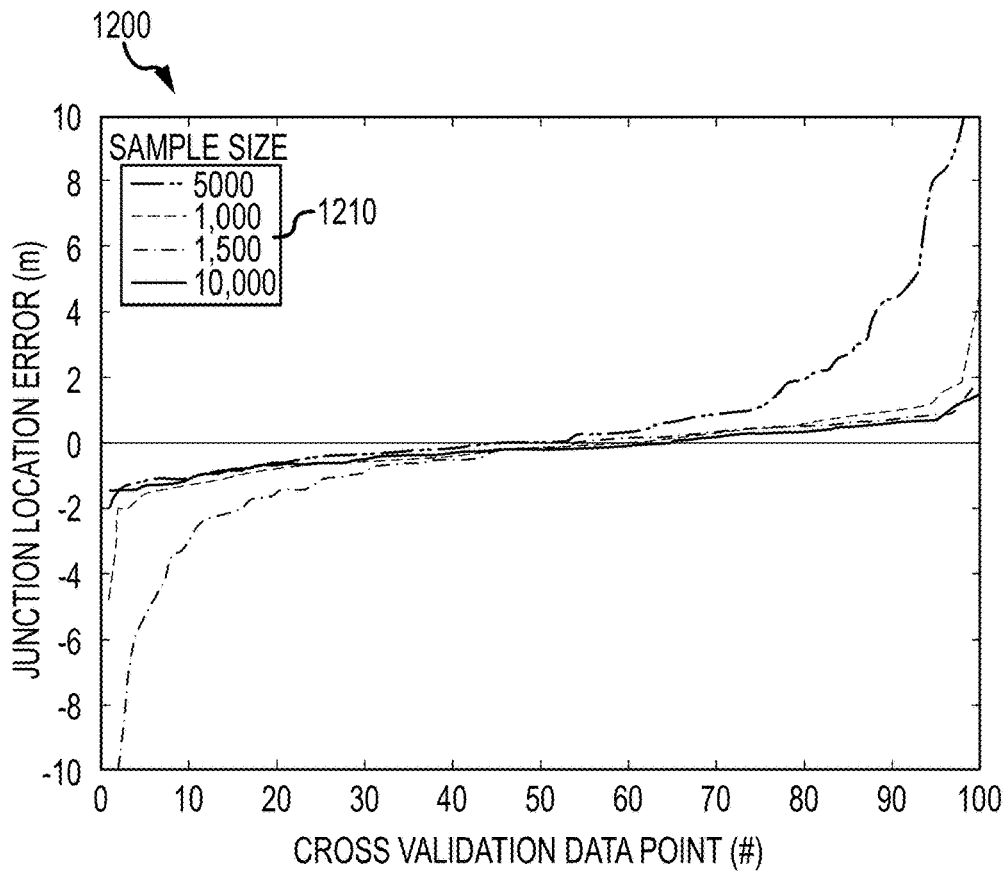
FIG. 14 is a plot of the pipe series junction location error for different input training data sample sizes sorted in accordance with increasing error from negative to positive.

Referring now to FIG. 14, there is shown a plot 1200 of the pipe series junction location error for different input training data sample sizes 1210 sorted in accordance with increasing order of magnitude from negative to positive. To facilitate the analysis, the errors in FIG. 14 were limited in the range [−10, +10] metres. By inspection, it can be seen that errors when using 5,000 or 10,000 pipe series junction locations in the input data set are similar to one another and are between [−2, +2] metres. Table 2 presents the square error function, calculated with the above equation, the average absolute error and the maximum error for the four sample sizes that were considered. Information in this table confirms that the performance with a sample size of 5,000 and 10,000 is similar for the three performance metrics shown. Only in the maximum error, does a training data set sample size of 10,000 provide a slightly better result, while the average error and the square average error (represented as E) are virtually the same.

TABLE 2

Different input sample sizes for pipe series junction location.

| Input Sample Size | Square error function (m²) | Average absolute error (metres) | Maximum error (metres) |
|---|---|---|---|
| 500 | 7.15 | 2.36 | 17.35 |
| 1,000 | 0.60 | 0.77 | 4.78 |
| 5,000 | 0.22 | 0.52 | 1.96 |
| 10,000 | 0.21 | 0.53 | 1.51 |

Based on the above evaluation, a sample size of 5,000 was selected as the most appropriate as it provided acceptably accurate results for the location of the pipe series junction with significantly less computer effort. A further consideration for the training data (as part of step 510) for the ANN is whether to generate the locations of the pipe series junctions uniformly along the pipeline and calculate a transient pressure wave interaction signal for each generated pipe series junction location or alternatively to generate the pipe series junction locations randomly along the pipeline. Considering the 1000 metre pipe 6010 in FIG. 8, if the data sample size (both for training and testing) is selected to be 10,000 then a pipe series junction would be located at each 0.1 metre of the pipe. In this case, the uniform generation would correspond to locating the pipes series junction at $x_R=[0.1, 0.2, 0.3, \ldots]$ while the random generation would correspond to locating the pipes series junction at for example the random locations specified as $x_R=[0.122, 0.268, 0.306, \ldots]$.

To evaluate which approach is more appropriate (ie, between uniform or random), 40 runs (including training and testing) of a 1D Convolutional ANN architecture were executed with an input sample size of 10,000 locations considering 20 runs with a uniform set of data and 20 runs with randomly spaced data.

The reason why different training/testing procedures have been developed for this example is that, the training process of an ANN involves, in this example, the application of the stochastic gradient descent algorithms, which includes successive selection of groups of training samples to determine the weights 420 of the ANN 400. Therefore, each time that a training process occurs, the weights 420 of the ANN 400 are not exactly the same. Given that the differences between using uniformly or randomly generated input data are expected to be small, several runs (including training and testing) were necessary. In this way, a statistically significant decision can be made in relation to selecting either uniform or random generation of the input data.

Figure 15:
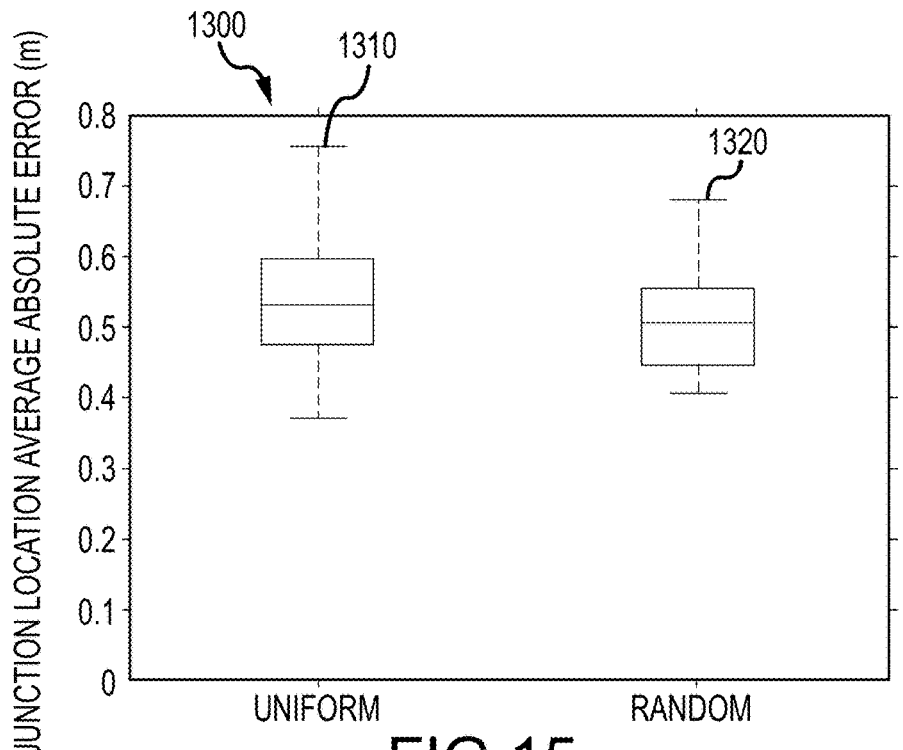
FIG. 15 is a box and whisker plot of the average absolute error in determining the location of a pipe series junction comparing uniform and random input training data for a 1D Convolutional ANN architecture.
Figure 16:
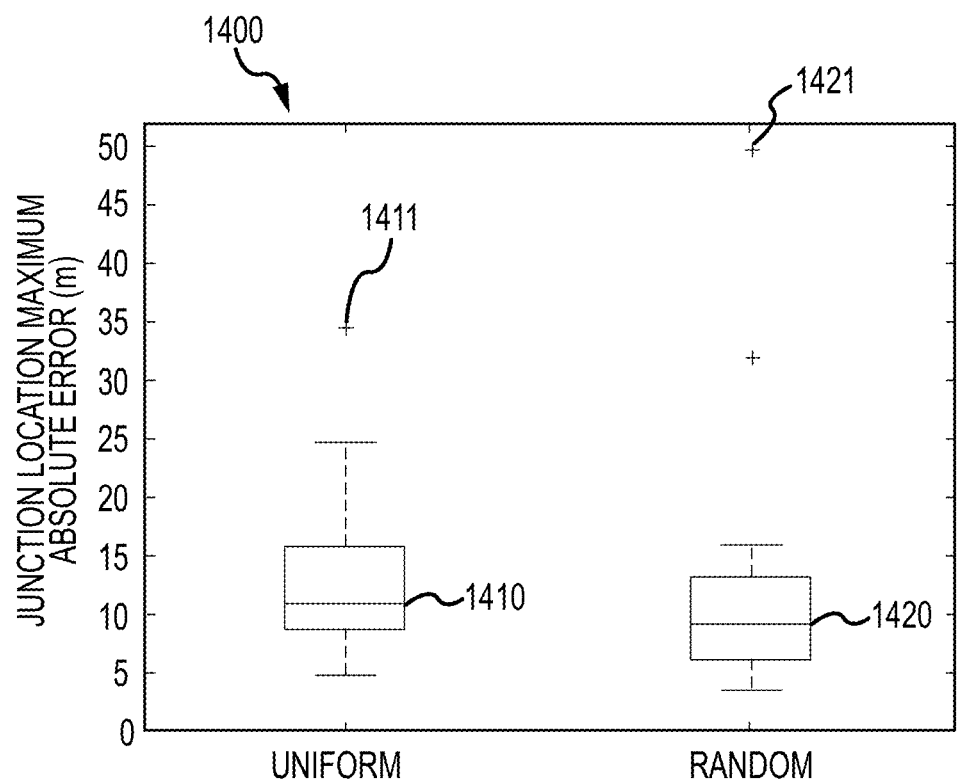
FIG. 16 is a box and whisker plot of the maximum absolute error in determining the location of a pipe series junction comparing uniform and random input training data for a ID Convolutional ANN architecture.

Referring now to FIG. 15 there is shown a box and whisker plot 1300 of the average absolute error in determining the location of a pipe series junction comparing when uniform and random input training data has been used to train and test the 1D Convolutional ANN. Similarly, in FIG. 16 there is shown a box and whisker plot 1400 of the maximum absolute error in determining the location of a pipe series junction comparing the uniform and random input training data cases.

As can be seen by inspection, for both the average and maximum absolute error of the location of the pipe series junction, randomly generated data provides better performance in terms of the median value of the error and the distribution of errors. The maximum of the average absolute errors for a uniform generation of pipe series junction locations 1310 is around 0.75 metres, while for the random generation of pipes series junction locations this maximum value 1320 is 0.68 metres. On the other hand, the median of the maximum absolute error 1420 is slightly smaller for the random generation than for uniform generation yet the maximum absolute error 1421 is almost 50 metres in comparison with a maximum absolute error 1411 for the uniform generation of 34.5 metres.

On balance, random generation was selected because in this instance the median of the absolute errors, both maximum and average, were smaller for the case where the ANN is trained based on randomly generated pipe series junction locations.

In order to train the ANN to identify and determine hydraulic features in the pipeline, multiple locations of these features are used as training samples for the ANN (step 320). In this example, where the pipeline is assumed to have a length of 1,000 metres, depending on the input sample size, the distance between the locations of the features can vary between 0.1 metres (for 10,000 data samples) and 2 metres (for 500 data samples). As such, the numerical simulation of the transient pressure wave interaction signal based on the MOC (step 520) should be sufficiently resolved in terms of selection of the computational reach to reflect different pressure traces for each location.

The two partial differential equations that govern unsteady pipe flow behaviour in terms of flow and head have two independent variables: distance along the pipeline (x) and time (t). These equations do not have a general solution; therefore, a transformation (known as Method of Characteristics) is applied to solve these equations. The MOC transforms the two partial differential equations into four ordinary differential equations which are treated as two pairs of equations as they are linked. In each of these pairs, one of the ordinary differential equations is:

$$\frac{dx}{dt} = \pm a$$

where a is the wave speed of the fluid in m/s.

These two equations are known as characteristics lines. When the MOC numerical method is applied, the two remaining compatibility ordinary differential equations are valid along these discretised characteristic lines. Accordingly, there is always a defined relationship between a reach length (spatial resolution of the numerical application of the MOC) and the computational time step (the Courant condition) given by:

$$\frac{\Delta x}{a} = \Delta t$$

where $\Delta x$ is the reach length used for the numerical computation in metres, $\Delta t$ is the required time step in seconds.

Considering this Courant condition as given above, for instance, to obtain pressure traces at each 0.1 metre distance along of the pipeline, a time resolution of 0.1 miliseconds is needed (assuming a wave speed of 1,000 m/s) which results in more than 20,000 pressure values to model a period of 2.5 seconds after the generation of the transient pressure wave. Taking into account that a spatial resolution of 0.1 metres corresponds to the case in which 10,000 locations are used for training and testing the ANN, the complete input data set in this case would include 200 million pressure values. Previously, these large data sets have made the ANN training process extremely computationally intensive and have presented a barrier to adopting these techniques for detecting hydraulic features of pipelines due to the prohibitive data processing requirements required to train the ANNs for each hydraulic feature type.

As referred to above, the present Applicant has discovered that the numerically generated pressure signals 520 may be downsampled dramatically to reduce the size of the input data required for training without compromising the training results of the ANN. Correspondingly, the measured transient pressure wave interaction signal 120 in accordance with this disclosure will also be correspondingly downsampled to match the input of the corresponding ANN. This downsampling reduces the size of the input data for the ANN and in this example allows a series of ANNs, each trained for a particular hydraulic feature type, to be applied to the downsampled transient pressure wave signal to provide results in real time and on-site if required.

Figure 17:
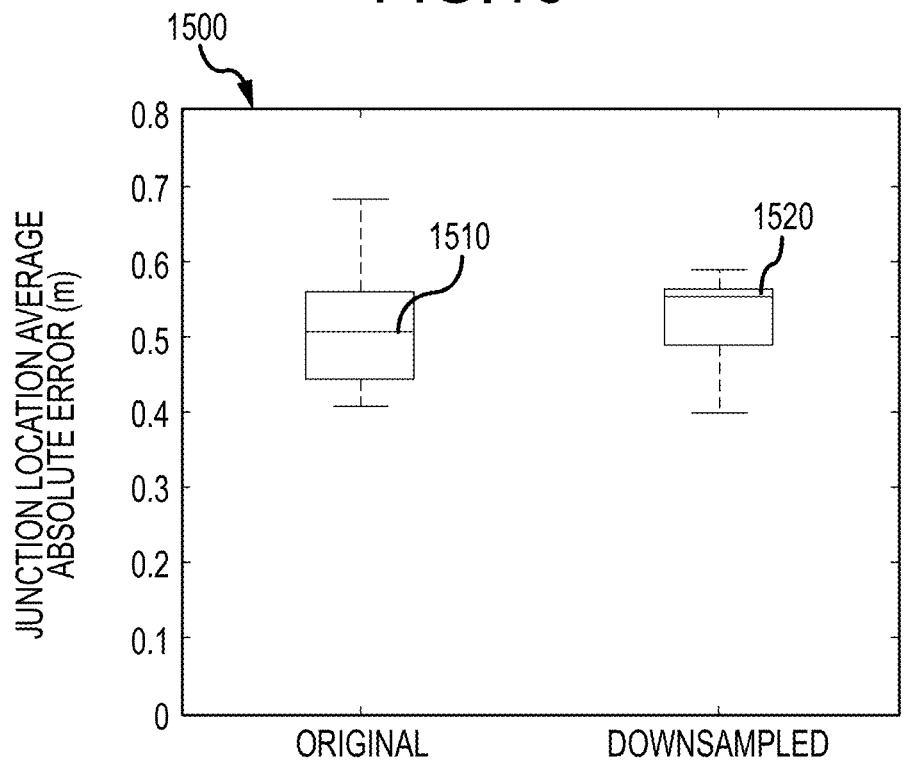
FIG. 17 is a box and whisker plot of the average absolute error in determining the location of a pipe series junction comparing original and downsampled input training data for a 1D Convolutional ANN architecture.
Figure 18:
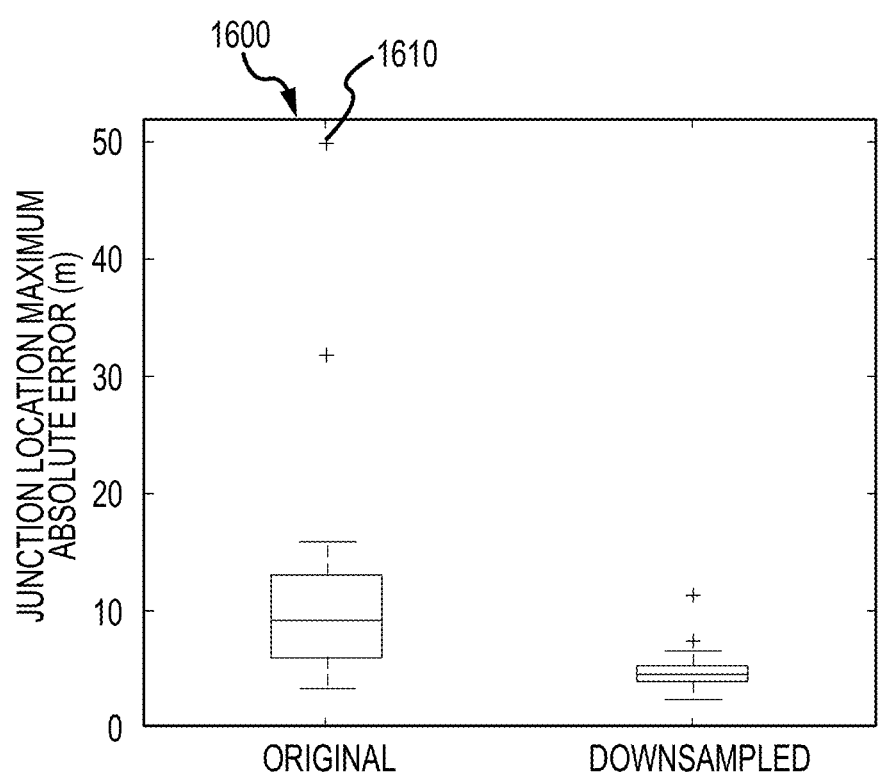
FIG. 18 is a box and whisker plot of the maximum absolute error in determining the location of a pipe series junction comparing original and downsampled input training data for a 1D Convolutional ANN architecture.

In order to determine the effectiveness of downsampling, a series of tests have been developed. The performance of ANNs were tested with downsampled data. Referring now to FIGS. 17 and 18, there are shown box and whisker plots 1500, 1600 of the average and maximum absolute errors in determining the location of a pipes series junction comparing original (no downsampling) and downsampled input training data for a 1D Convolutional ANN 800. In this example, 20 runs of a 1D Convolutional ANN trained on an input data set of 26,800 time steps (no downsampling) are compared with 20 runs with the same ANN, but this time trained on a downsampled input data set of 1,219 time steps.

As can be seen from inspection of FIG. 17, the median of the average absolute error for the downsampled training data 1520 based on 1,219 time steps is slightly larger than that for the original training data 1510 based on 26,800 time steps. In contrast, the total range of variation of the average absolute error is smaller for the downsampled data. In relation to FIG. 18, the results for the maximum absolute error are notably better for the downsampled training data. In this case, none of the 20 examples based on the downsampled training data exhibited extreme maximum errors, while the original training data based on 26,800 time steps resulted in the prediction of a location 1610 that was 50 metres away from the correct pipe series junction location.

Referring once again to FIG. 7, at step 510 after defining the ANN structure (1D Convolutional or Dense), the characteristics of the training data (input data size, uniformly or randomly generated data and downsampling or no downsampling) are chosen as was shown for the pipes series junction example. At step 520, the MOC based numerical modelling is used to numerically generate transient pressure wave interaction signals with both a sufficiently small spatial resolution (in terms of the number of locations along the pipeline) and an associated time step resolution. In accordance with the present disclosure, at step 530 the numerical transient pressure signals are downsampled to obtain the data of a reduced size to serve as input for training the ANN. As referred to previously, this process of downsampling results in a significant reduction in the computer run time of the ANN for both the training and testing phases of the ANN process, allowing the methods and systems implemented in accordance with this disclosure to be deployed in real time.

At step 540, the method for training the ANN requires in this example three processes for preparing the input data: selecting the data, randomizing the data and normalizing the data. Selection of the data refers to partitioning of the data for the training and the testing stages. In the example presented for the pipe series junction location, half of the generated data was selected for the training process. Therefore, out of the 5,000 locations of the pipe series junction, only 2,500 locations are used for the training process. The second process is the randomization of the training data set in which the locations of the pipe series junctions are shuffled. Finally, the normalization process which is common for ANNs involves scaling the input data for training (including the transient pressure signal, the junction location and the diameters of the two segments of the pipe on either side of the junction) to obtain a normal distribution with a mean of zero and a standard deviation of one. Once these three transformations are completed, the stochastic gradient descent algorithm is used to train the ANN.

Referring once again to FIG. 3, once a series of ANNs have been trained for identifying and characterizing different hydraulic feature types in pipelines from a downsampled transient pressure wave interaction signal following the generation of a transient pressure wave then they may be applied to successively determine whether these selected hydraulic feature types are indicated following method 300.

Following is an example of the performance of an ANN trained to determine a hydraulic feature in the form of a pipes series junction as discussed above and its associated hydraulic feature characteristics.

Referring back to the pipeline model 6000 of FIG. 8, a method for analysing the condition of a pipeline based on a trained ANN (as described above) is evaluated for the task of determining the location and sizing of a pipe series junction between two pipes sections of different diameters. In this example, the location of a junction was predicted by the length of the upstream segment of the pipe x as indicated in FIG. 8. Sizing for the junction model refers to the determination of the two diameters associated with the two segments of the pipe on either side of the junction which are selected from the combination of diameters provided in Table 1.

Based on the above evaluation, as part of the training process 500 a 1D Convolutional architecture was chosen for the ANN using an input data set consisting of 5,000 samples where the pipe series junction locations were generated randomly along the pipeline and where the resulting simulated transient pressure wave interaction signals were downsampled to 1,219 time steps. Out of those 5,000 samples, 2,500 were selected for the training stage and 2,500 were used in the testing stage of the process.

Figure 20:
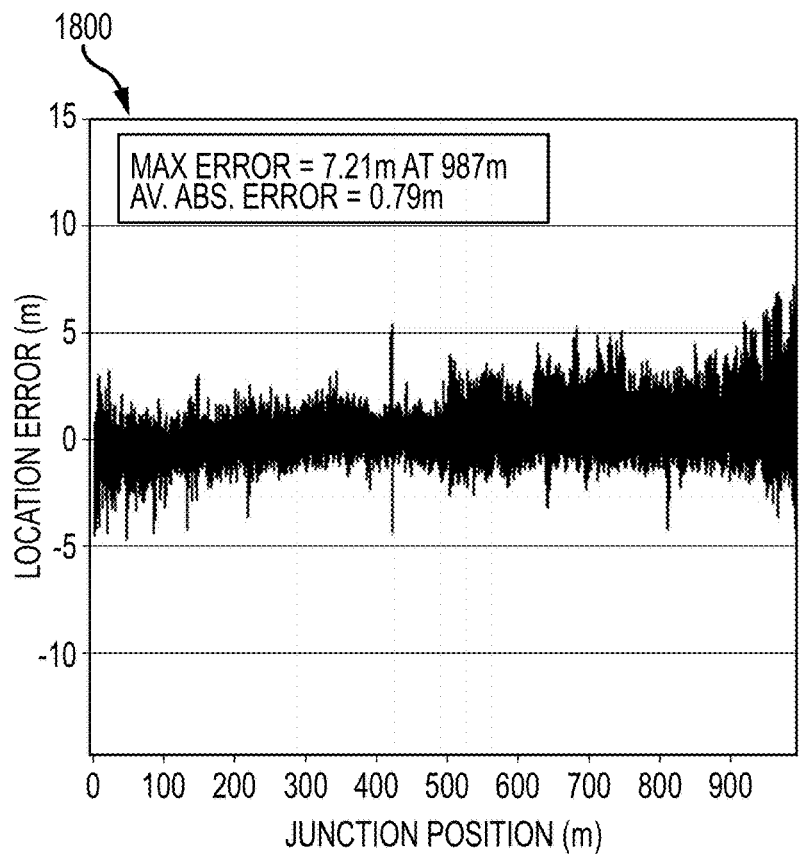
FIG. 20 is a plot of the pipe series junction location error as determined by the trained ANN operating on the input training data sample used to train the ANN.

Referring now to FIG. 20, there is shown a plot 1800 of the pipe series junction location error as determined by the 1D Convolutional ANN operating on the 2,500 samples that were used to train the ANN. As can be seen from FIG. 20, the average absolute error when the ANN was trained was 0.79 metres, with a maximum error of 7.21 metres when the pipe series junction is located 987 metres downstream of the reservoir (ie, within 13 metres of the end of the pipeline) noting that the total length of the pipe is 1,000 metres.

By inspection of FIG. 20, it is possible to observe that near the extreme ends of the pipe the results tend to present larger errors in comparison to the results in the central part of the pipe. When the pipe series junction is located close to either extreme end of the pipeline, the reflection from the pipe series junction interacts with the reflection at the reservoir (if the pipe series junction is close to the upstream end) or with the initial pressure rise (if the pipe series junction is close to the downstream end of the pipe). For these locations, instead of having a pressure drop (or increase depending on the ratio of diameters $D_1/D_2$), the presence of the pipe series junction causes a short spike at the beginning of the trace or close to a time of 2 L/a seconds where the ANN has difficulty in using the same weights that represent the behavior along the rest of the pipeline.

Figure 21:
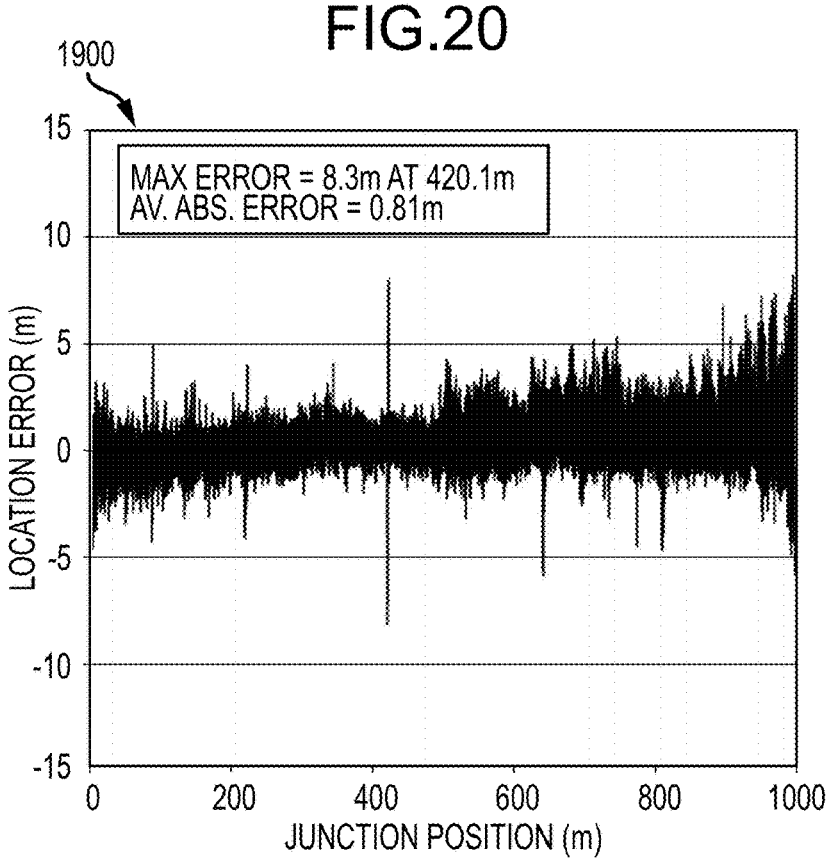
FIG. 21 is a plot of the pipe series junction location error as determined by the trained ANN operating on a testing data sample.

Referring now to FIG. 21, there is shown a plot 1900 of the pipe series junction location error as determined by the 1D Convolutional ANN operating on 2,500 testing samples. In this case, the average absolute error was 0.81 metres with a maximum error of 8.3 metres when the pipe series junction is located at 420.1 metres downstream of the reservoir noting that the total length of the pipe is 1,000 metres. By comparing FIG. 20 with FIG. 21, it is possible to conclude that the trained ANN is not overfitted since the error behaviour is similar for both the training and the testing data sets. As would be appreciated, overfitting is one of the key issues involved in the use of ANNs since depending on its parameters and the input data, an ANN can perform satisfactorily for the training set but poorly for new unknown data as the test data set.

Figure 22:
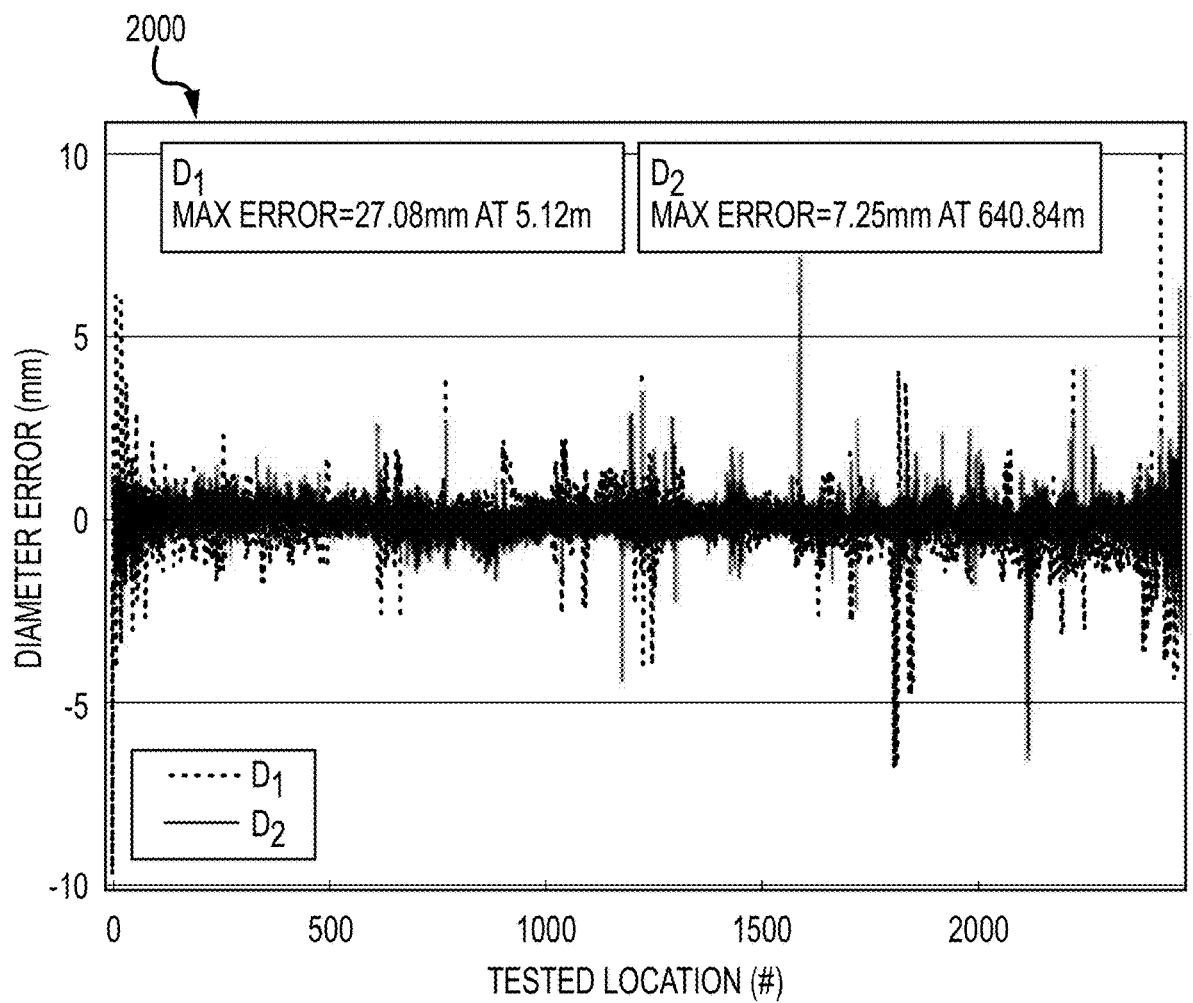
FIG. 22 is a plot of the errors in the estimation of the diameters of the pipe either side of the junction for the testing data sample.
Figure 23:
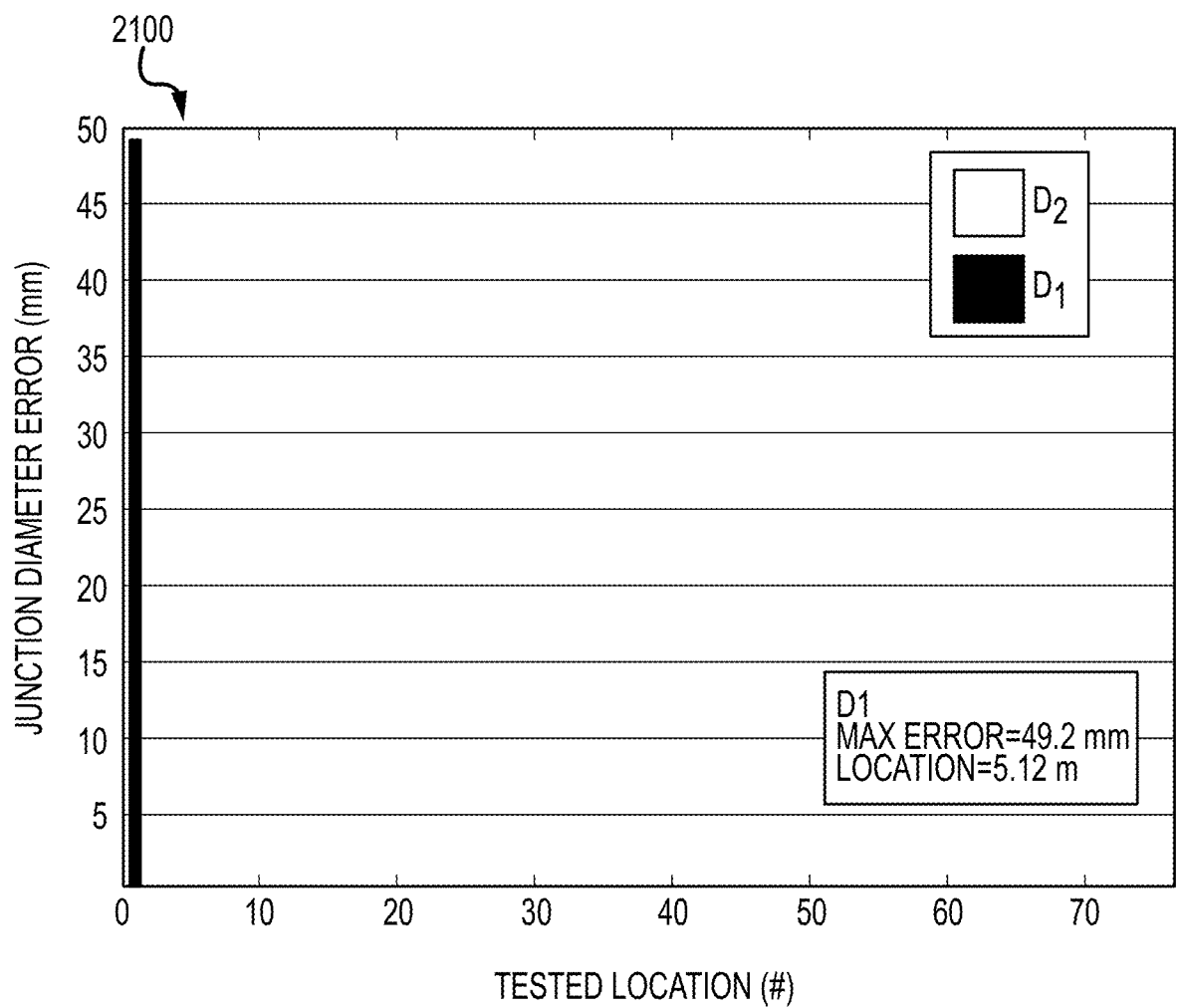
FIG. 23 is a plot of the errors in estimation of the diameters of the pipe either side of the junction for the testing data sample following rounding to predetermined available pipe diameters.

Referring now to FIG. 22, there is shown a plot 2000 of the errors in the estimation of the associated hydraulic feature characteristics in the form of values of both of the diameters on either side of the pipe junction (i.e., $D_1$ and $D_2$) for the testing samples. As can be seen from inspection, in general the errors in diameter determination are extremely low, reaching a maximum of 27.1 mm for $D_1$ and only 7.25 mm for $D_2$ in the worst cases. Average absolute errors were 0.31 and 0.27 mm respectively. However, when predicting diameters, it is important to consider that pipe diameters usually cannot take on continuous values due to commercial production restrictions and in FIG. 23, the determined diameters of the pipe were rounded to the closest diameter in the list defined in Table 1. As can be seen by inspection, only in one diameter prediction case (out of the 5,000 diameter predictions, two per each testing example) was the diameter $D_1$ not correctly identified.

Figure 24:
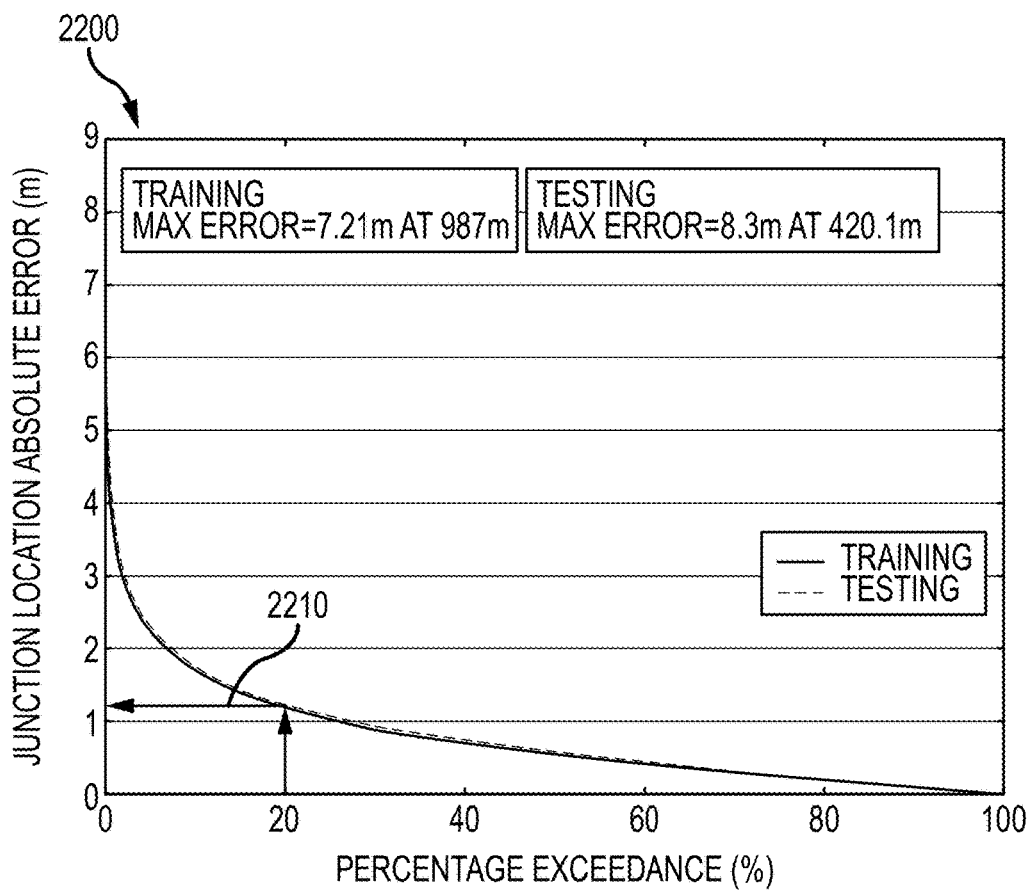
FIG. 24 is a plot of the percentage of samples where the indicated pipe series junction location error is exceeded.

Referring now to FIG. 24, there is shown an exceedances plot 2200 of the percentage of samples for the indicated pipe series junction location absolute error (also termed as the percentage exceedance). The percentage exceedance can be interpreted as the proportion of samples that the pipe series junction location exceeded the indicated error. For instance, in 20% of the testing samples at 2210, the pipe series junction location was predicted with an error of 1.4 metres or higher. For reference, the maximum location error for the training and the testing data sets are also shown in FIG. 24. By inspection it can be seen that the distribution of the errors shows that extreme values of error (larger than 3 metres) are relatively rare since they correspond only to 2% of the total testing samples. In addition, the similarity in the distributions of error for the training and the testing data sets (indicated by almost coincident lines in FIG. 24) also validates the performance of the 1D Convolutional ANN to predict the location of a pipe series junction in a single pipeline.

Similar systems can be established to train independent ANNs that recognize the presence, location and hydraulic feature characteristics of different hydraulic feature types which will characterise the pipeline. This series of trained ANNs are then used as presented in FIG. 3. A second example of the training and testing of an ANN to identify a specific hydraulic feature is now presented.

Figure 25:
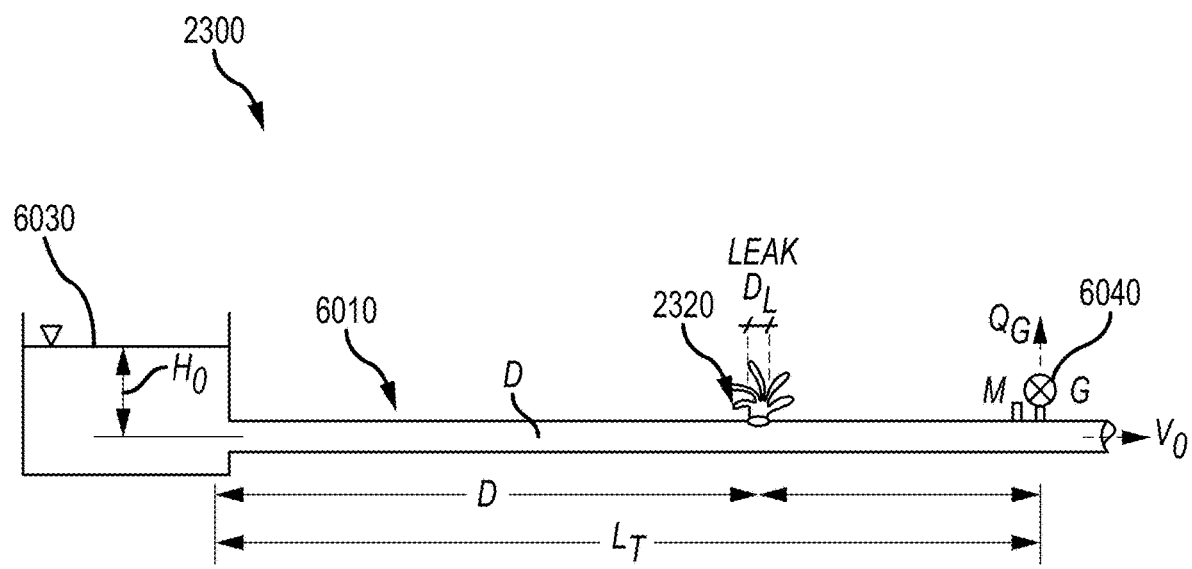
FIG. 25 is a pipeline model for training the ANN to recognise a hydraulic characteristic in accordance with another illustrative embodiment.

Referring now to FIG. 25, there is shown a pipeline model 2300 for training the ANN to determine a hydraulic feature according to an illustrative embodiment. In this example, the hydraulic feature is a leak 2320 in a single pipeline 6010 whose size may vary. Similar to FIG. 8, the pipeline 6010 is connected at the upstream end to a reservoir 6030 with a fixed head $H_0$ and at the downstream end to a valve 6040 where the transient pressure wave is generated. The location of the leak is determined by a distance x measured from the upstream reservoir and the total length of the pipeline 6010 is defined as $L_T$. The diameter of the pipeline (D) is fixed for all the numerical simulations and the diameter of the leak is defined as $D_L$.

In this example, the steady state head and velocity were the same as for the pipes series junction system. A ductile iron pipe with cement mortar lining is considered with an internal pipe diameter of 727.5 mm, a ductile iron pipe wall thickness of 4.76 mm and a cement mortar lining thickness of 12.5 mm. A steady state flow of 62.35 L/s results from the initial velocity of 0.15 m/s. The total length of the pipe is 1000 metres and a steady state Darcy-Weisbach friction factor was calculated for an assumed roughness height of $\varepsilon=0.01$ mm.

Considering that the detection of a hydraulic feature type in the form of a leak includes both its location and size, different leaks are modelled. For all leak sizes, the leak was defined as a circular orifice with diameter $D_L$ that varied in diameter between 13 mm and 58 mm. This diameter range was selected taking into account the flow through the leak in comparison with the steady state flow in the pipeline.

As described previously, once again in this illustrative embodiment, generation of the transient pressure wave interaction signal data for the training and testing (see step 520 in FIG. 7) was conducted using a MOC computer simulation model by changing the diameter of the leak orifice randomly with a precision of 1 mm. The location of the leak was also modified in each simulation and details of the settings for generating the locations of the leaks (see step 510 in FIG. 7) are presented. The period of time used to generate the numerical pressure traces was 2.5 seconds, which corresponds to a time larger than the first period of reflections 2 $L_T/a$ in this example.

Referring once again to FIG. 7, at step 510 the parameters of the input data set for the ANN need to be defined. A 1D Convolutional architecture was adopted for the ANN as previously described for the pipes series junction location model. Moreover, the location of the leak was changed randomly within each 0.2 metres along the pipeline in all cases. The selection of the 0.2 metre length was based on the results of the input sample size used to train the ANN to determine the pipe series junction location. Generating transient pressure traces in the pipelines by changing the location of the leak within a shorter segment of pipeline (say 0.1 metres) may improve the results but would significantly increase the required computational time.

It was anticipated that in this example the transient pressure deviations induced by the presence of a leak would be more subtle than the pressure deviations for a pipes series junction potentially resulting in the need for the use of more training samples. Therefore, four different input data size sets were tested for the leak location example: 5,000, 10,000, 25,000 and 50,000. For instance, for a sample size of 25,000, five different locations were considered within each 0.2 metre length along the pipe. A validation data set of 100 random locations was used to select the input data size for the training and testing of an ANN for detecting leaks in pipelines.

Figure 26:
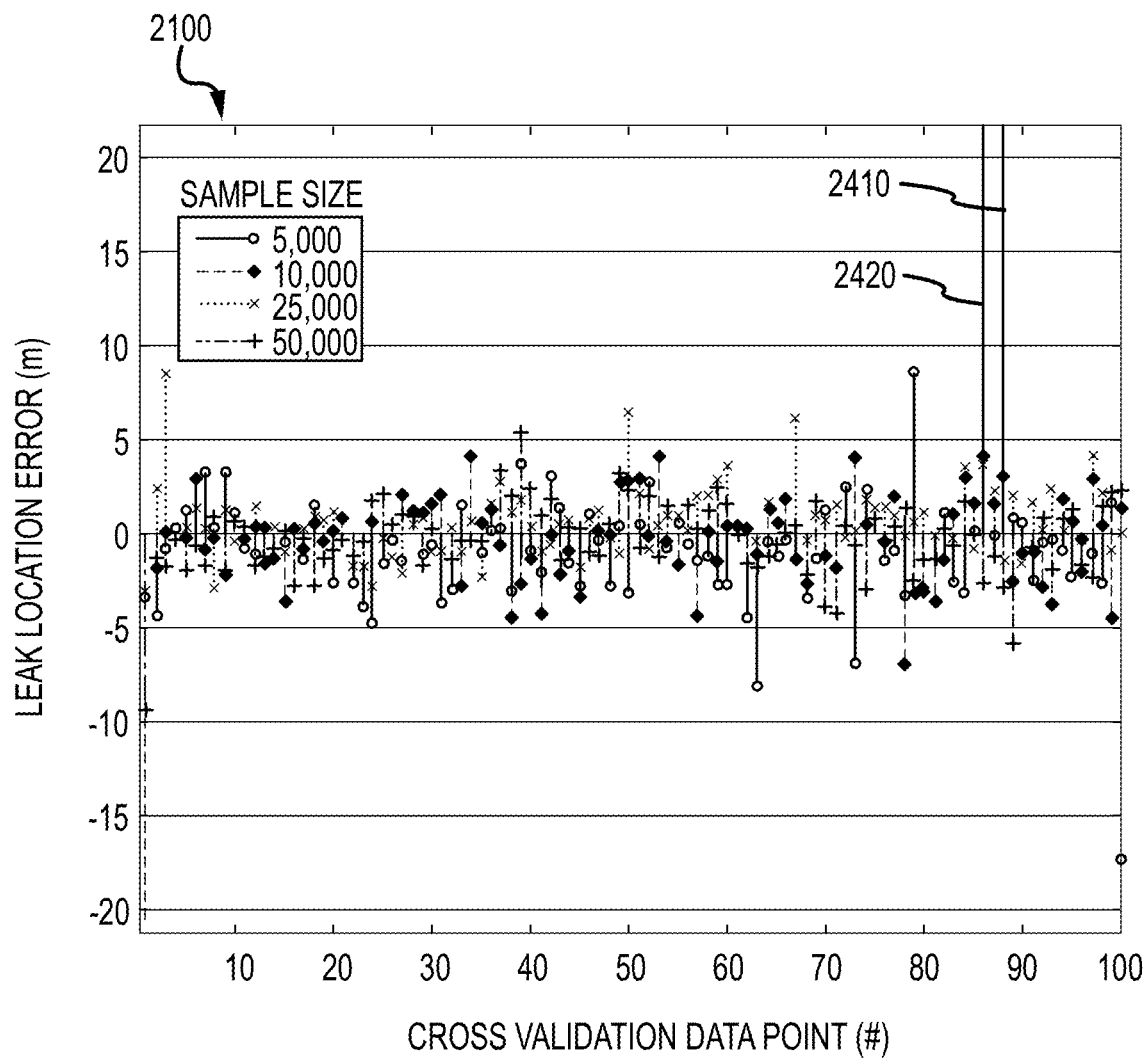
FIG. 26 is a plot of the leak location error for different input training data sample sizes.

Referring now to FIG. 26, there is shown a plot 2400 of the leak location error for different input data sample sizes of 5,000, 10,000, 25,000 and 50,000 locations along the pipe. These results have been sorted according to increasing distance along the pipe moving from left to right as shown in FIG. 25. By inspection, it is clear that adopting only 5,000 training samples results in large errors in the validation set, where two of the locations 2410, 2420 had almost a value 50 metres error (not visible in FIG. 26 due to the scale). In addition, metrics established for comparing the results (presented in Table 3) showed a poor performance of the ANN when using a sample size of 5,000. Selecting a data set size of 10,000 samples helps in reducing the square error function from a value of 25.15 to 10.45, however, the maximum error was again as large as 40.47 metres in one location close to the reservoir.

TABLE 3

Different input sample sizes for leak location.

| Input Sample Size | Square error function (m²) | Average absolute error (metres) | Maximum error (metres) |
|---|---|---|---|
| 5,000 | 25.15 | 2.81 | 46.13 |
| 10,000 | 10.45 | 2.01 | 40.47 |
| 25,000 | 1.85 | 1.33 | 8.57 |
| 50,000 | 1.97 | 1.45 | 9.34 |

As can be seen, results for predictions made with ANNs trained with 25,000 and 50,000 are significantly better than the first two sample sizes (see also FIG. 26 and Table 3). Values for the three metrics established to analyse the error were also smaller for sample sizes of 25,000 and 50,000. Nonetheless, is not clear between those two sample sizes, which one is preferable.

Figure 27:
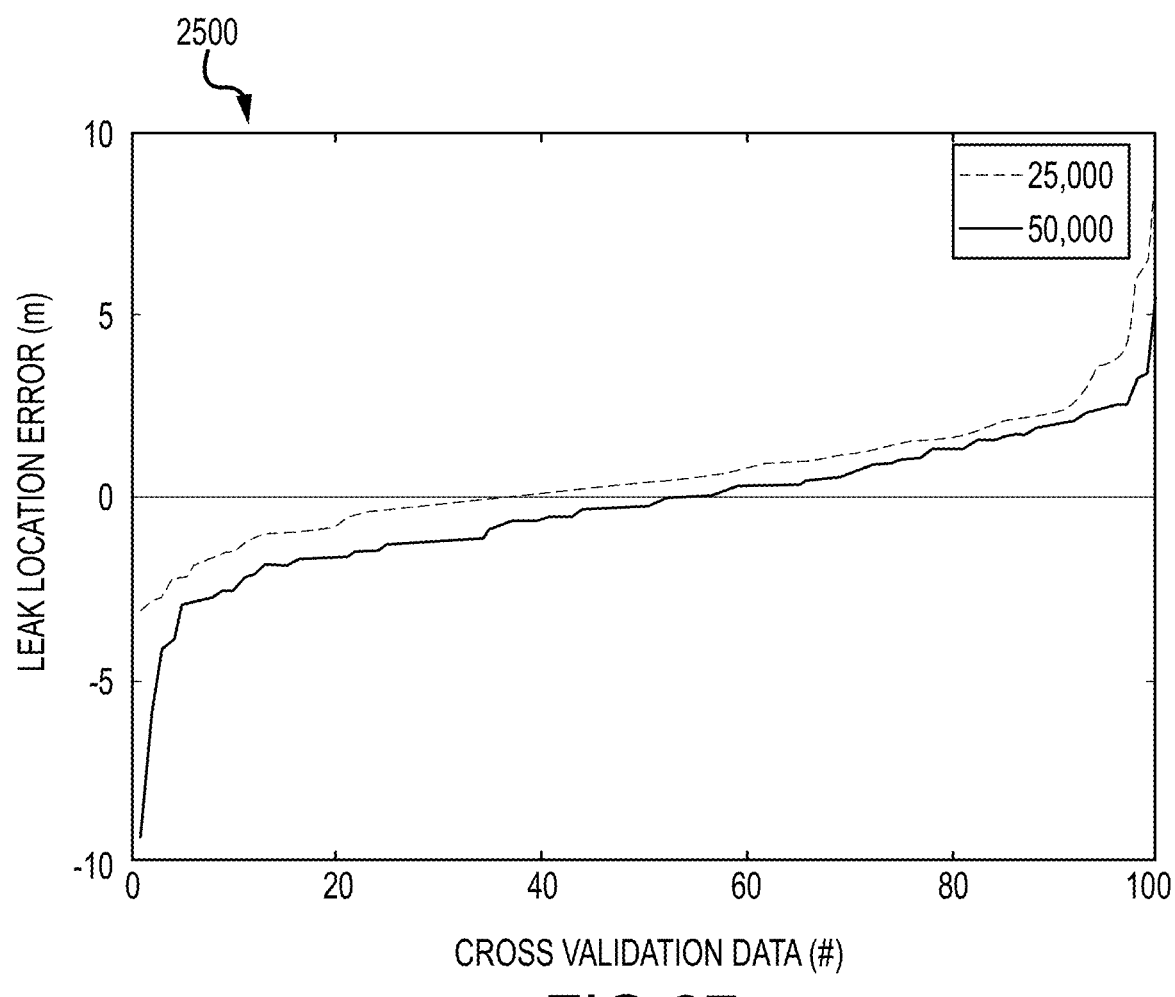
FIG. 27 is a plot of the leak location error for different input training data sample sizes sorted in accordance with increasing error from negative to positive.

Referring now to FIG. 27, there is shown a plot 2500 of the leak location error sorted in accordance with increasing order from negative to positive for sample sizes of 25,000 and 50,000. By inspection, it is evident that the distribution of errors for both cases is similar; while the 1D Convolutional ANN trained with 50,000 samples has smaller positive location errors, the 25,000 1D Convolutional ANN performs better when negative errors are considered. Given these results, with the validation set of 100 locations it was not possible to choose a preferred sample size for the leak location; therefore, complete testing was carried out for both sample sizes.

Figure 28:
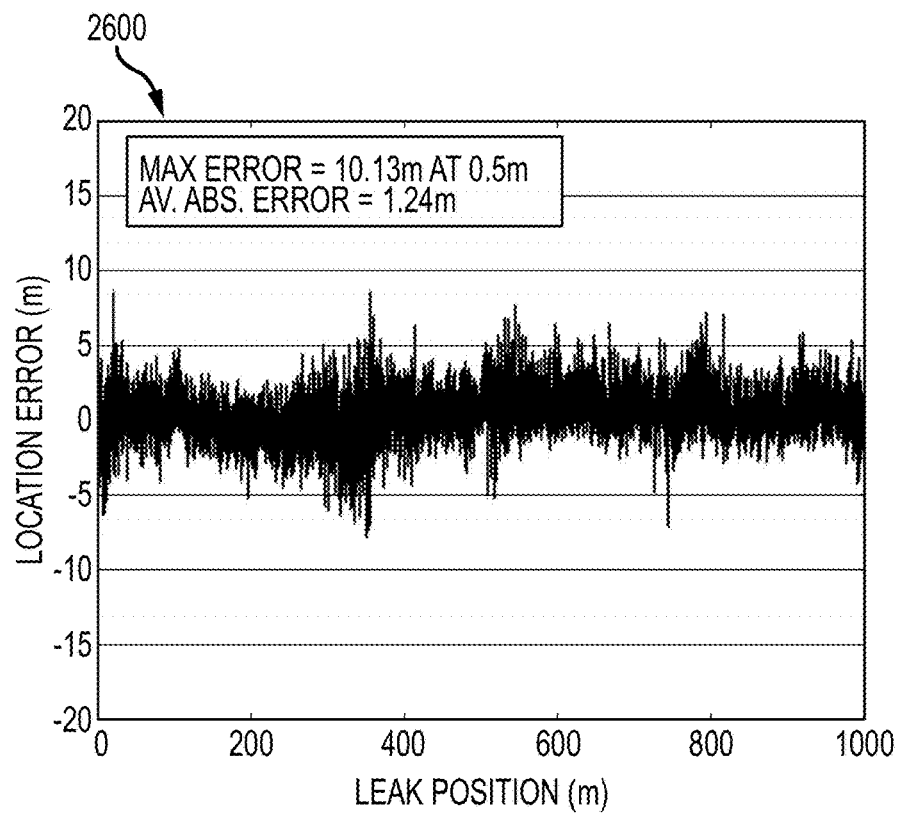
FIG. 28 is a plot of the leak location error as determined by the trained ANN operating on the input training data sample consisting of 25,000 samples used to train the ANN.

Referring now to FIG. 28, there is shown a plot 2600 of the leak location error as determined for the 1D Convolutional ANN on 12,500 samples that were used to train the ANN for an input sample size of 25,000 (half for training, half for testing). As can be seen from FIG. 28, the average absolute error for the training data set was 1.24 metres with a maximum error of 10.13 metre when the leak is located 0.5 metres downstream of the reservoir.

Figure 29:
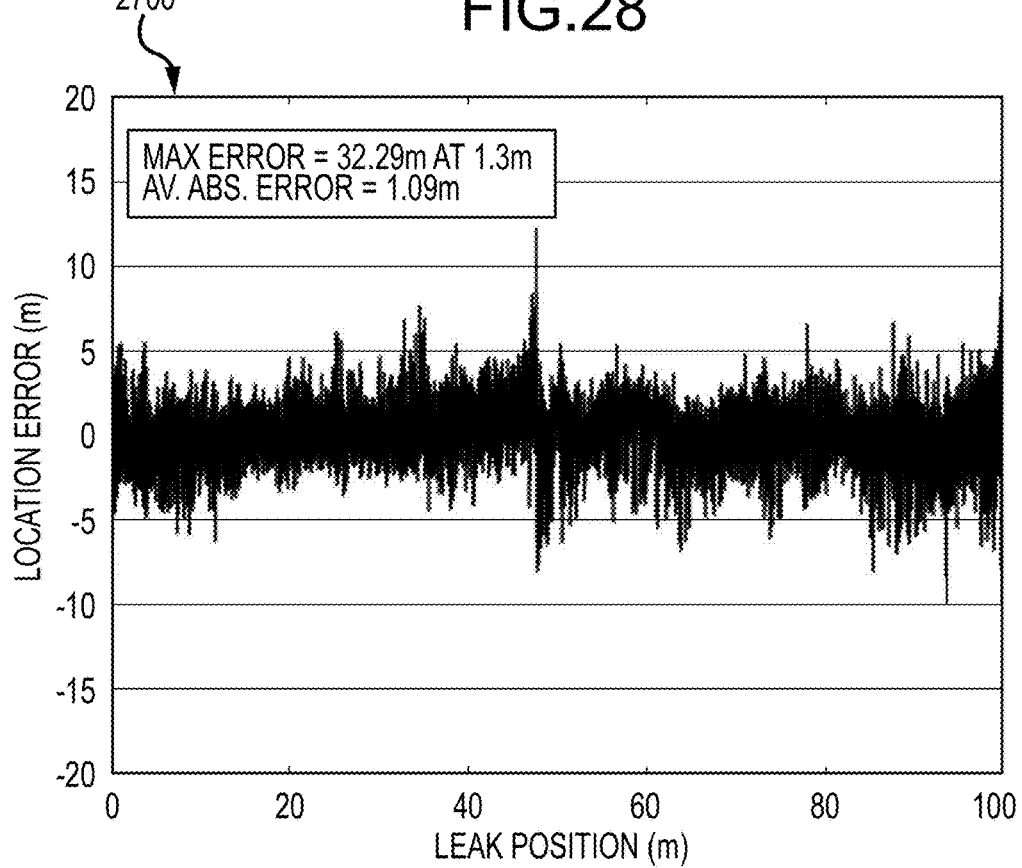
FIG. 29 is a plot of the leak location error as determined by the trained ANN operating on the input training data sample consisting of 50,000 samples used to train the ANN.

Referring now to FIG. 29, there is shown a plot 2700 of the leak location error as determined by the ID Convolutional ANN on 25,000 samples that were used to train the ANN for an input size of 50,000. As can be seen from FIG. 29, the average absolute error for training data set was 1.09 metres with a maximum error of 32.29 metres when the leak is located 1.3 metres downstream of the reservoir.

As can be seen by inspection of FIGS. 28 and 29, both sample sizes present acceptable results in the training stage, however, when both ANNs are used for predicting the leak location based on the testing data, the results differ for the two sample sizes.

Figure 30:
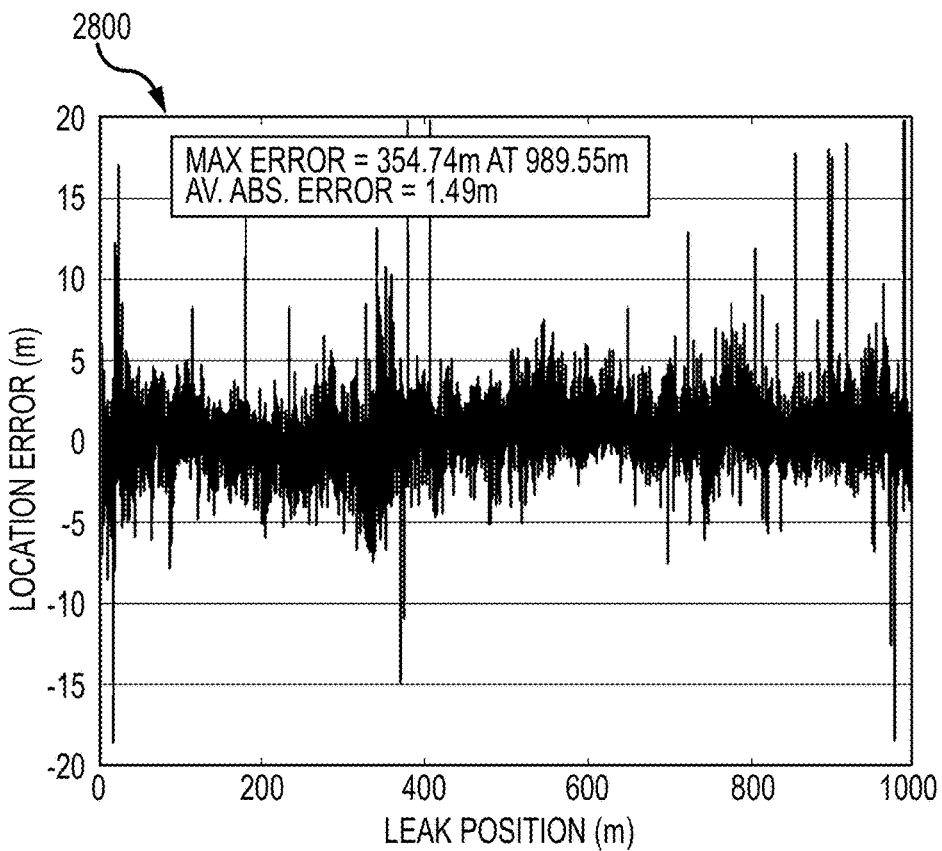
FIG. 30 is a plot of the leak location error as determined by the ANN trained on 25,000 samples operating on a testing data sample.

Referring now to FIG. 30, there is shown a plot 2800 of leak location error as determined by the 1D Convolutional ANN trained on 12,500 samples and tested on 12,500 different samples. In this case, the average absolute error was 1.49 metres with a maximum error of 354.74 metres when the leak is located 989.55 metres downstream of the reservoir noting that the total length of the pipe is 1000 metres. This large error is because when the leak is located very close the downstream end of the pipeline, its reflection interacts with the reflection at the reservoir making the identification of the leak difficult.

Figure 31:
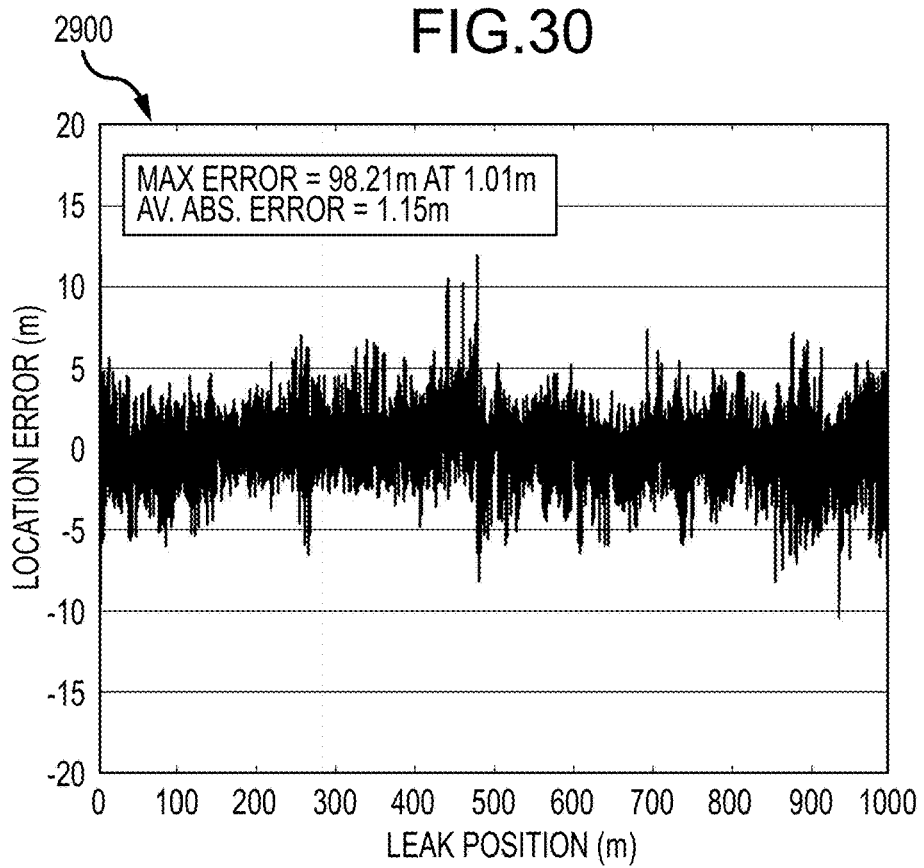
FIG. 31 is a plot of the leak location error as determined by the ANN trained on 50,000 samples operating on a testing data sample.

As can be seen by inspection of FIG. 30, there are many instances where the location error is greater than 5 metres. This implies that the ANN trained on 12,500 samples was overfitting samples since this ANN is unable to predict accurately the leak location based on the testing example input data. This can be compared to the case in FIG. 31, where there is shown a plot 2900 of leak location error as determined by the ID Convolutional ANN trained on 25,000 training samples and tested on 25,000 different samples. In this case, the average absolute error was 1.15 metres with a maximum error of 98.21 metres when the leak is located 1.01 metres downstream of the reservoir (again very close to the boundary). By comparing FIG. 29 with FIG. 31 it is possible to conclude that the trained ANN is not overfitted for the 50,000 samples data set, since the error behaviour is similar between the training and the testing data sets.

The effect of a leak that is close to either of the extreme ends of the pipe can be difficult to identify. But in a real application if the leak was located too close to either of the extremes, it would be visible. This is because the extremes of the pipeline would be accessible in order to isolate the pipeline before the test. Although in the examples provided so far in this disclosure, the pressure transducer is located at the downstream end of the pipeline, the analysis method may be adapted to include as a variable that the pressure measurement point may be located at any interior location along the pipeline.

Based on the above evaluation, it has been determined that a sample size of 50,000 is the most appropriate for the input data for the 1D Convolutional ANN that is being trained to determine the location and size of a leak for the scenario illustrated in FIG. 25.

Figure 32:
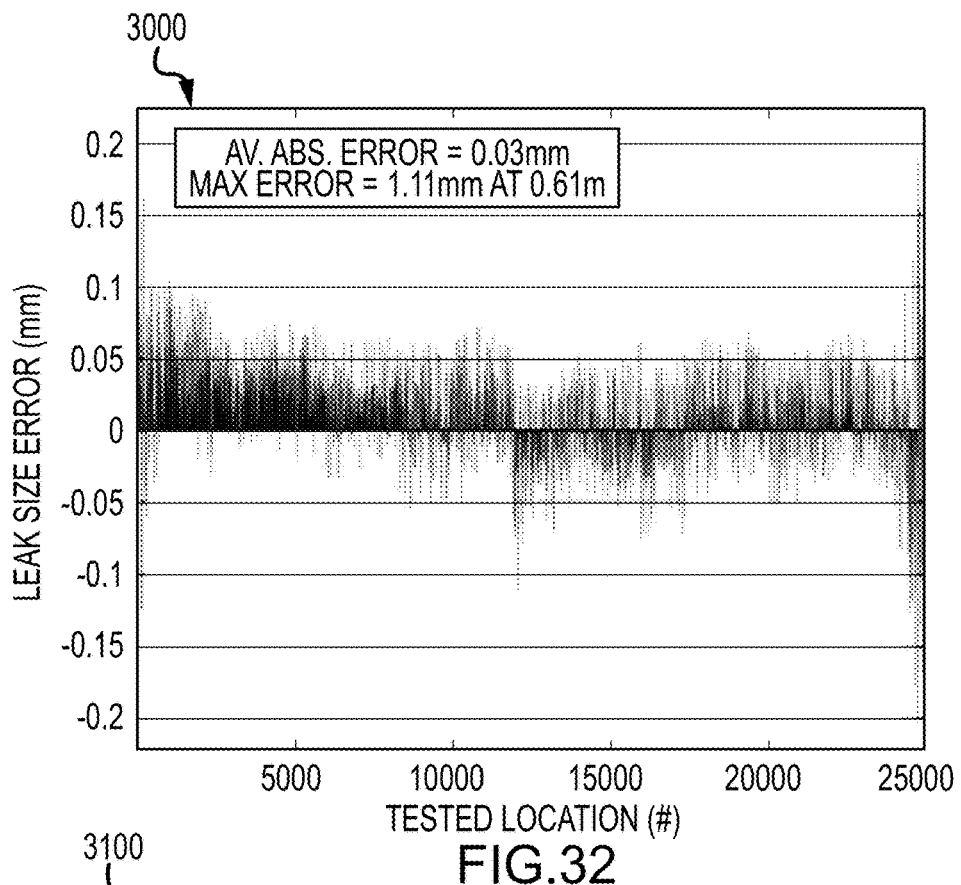
FIG. 32 is a plot of the errors in estimation of the leak size for the testing data sample.

Referring now to FIG. 32, there is shown a plot 3000 of the errors in leak size for the 1D Convolutional ANN trained on an input sample size of 50,000 (25,000 for training and 25,000 for testing). By inspection it can be seen that errors in leak size are mostly within the range of [-0.2, 0.2] mm. The maximum error is 1.11 mm when the leak is located only 0.61 metres away from the reservoir and the average absolute error for all the testing samples along the pipeline is 0.03 mm. As would be appreciated, these results will not only allow the determination of the location of the leak to be characterised but also its size.

Figure 33:
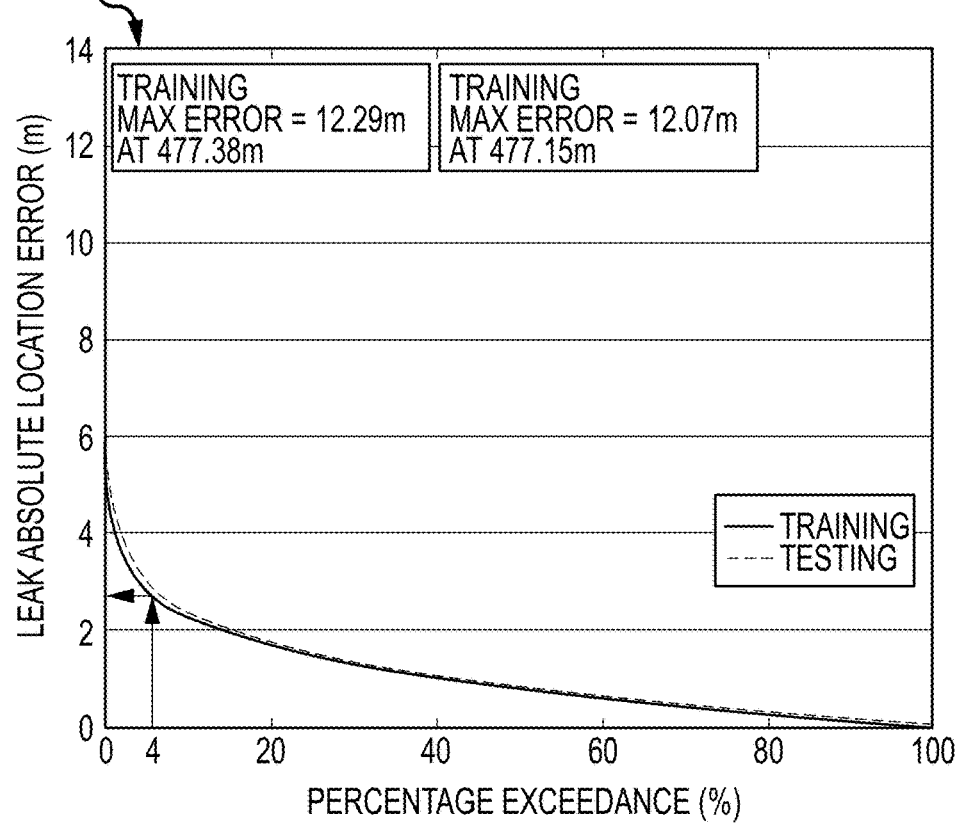
FIG. 33 is a plot of the percentage of samples where the indicated leak location error is exceeded.

Referring now to FIG. 33, there is shown an exceedance plot 3100 of the percentage of samples of the indicated leak location absolute error (also termed the percentage exceedance) for both the testing and training data sets. The percentage exceedance can be interpreted as the proportion of samples that the leak location exceeded the indicated error. In order to improve the analysis of the data, the first and the last 12 metres of pipeline length (which would correspond approximately to two pipe segments in the field) were eliminated before generating and plotting the data in FIG. 33 since it shows the behaviour of the error once the extreme and unrealistic artefacts are discarded. By doing this, the maximum error for both the testing and the training data sets is around 12 metres and it can be seen that errors larger than 3 metres are only found in 4% of the samples.

Likewise, in 80% of the samples, the ANN prediction for the absolute location error of the leak in the pipe is less than 1.7 metres, which represents 0.17% of the total length of the 1,000 metres analysed pipe. Finally, a similar distribution of location errors for the training and the testing data sets demonstrates the adequate performance of the ANN when it is predicting the leak location for the testing data set.

Figure 34:
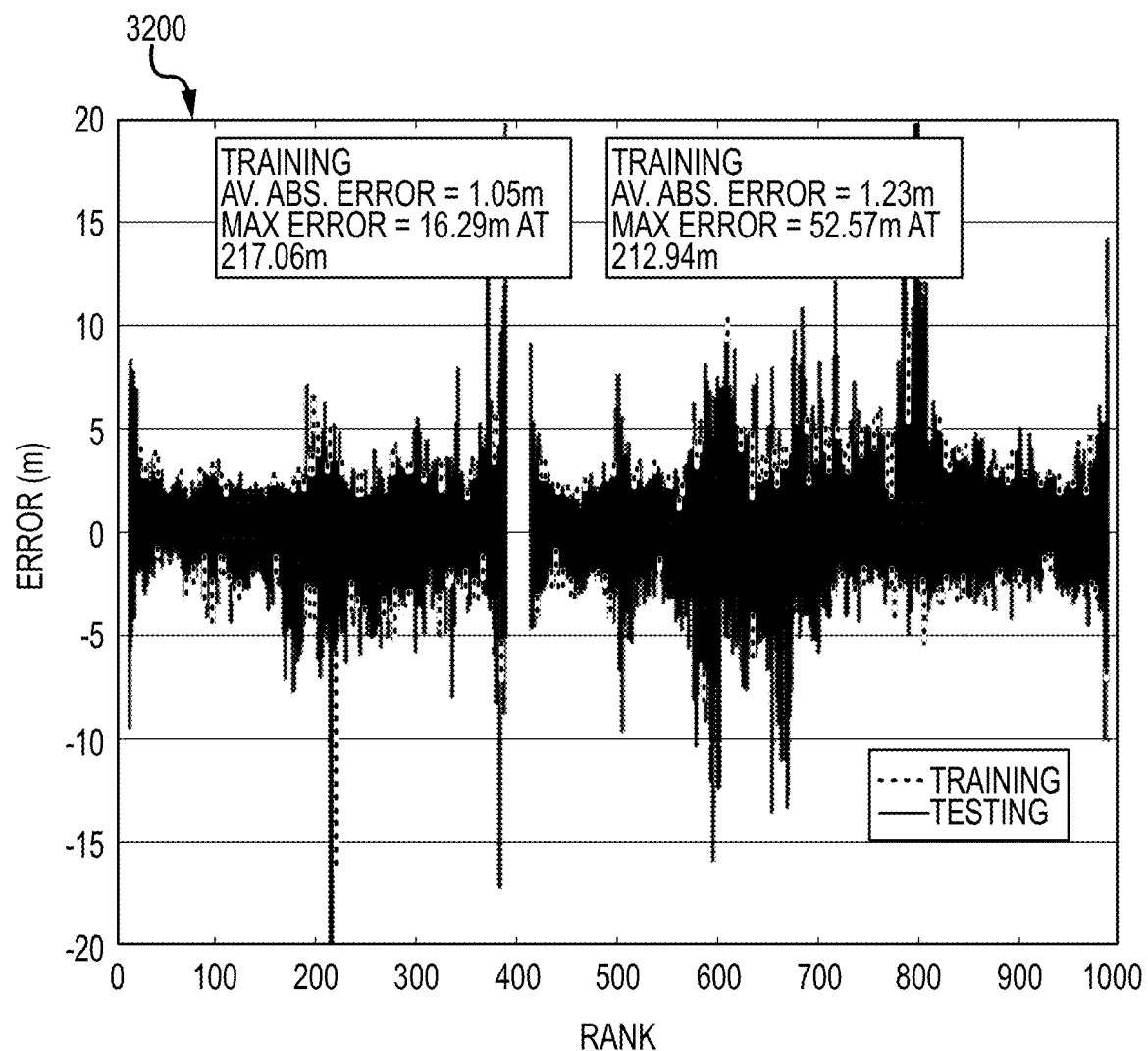
FIG. 34 is a plot of the leak location error as determined by the ANN trained on 25,000 samples and tested on 25,000 additional samples when the pressure transducer is located 400 metres downstream of the reservoir along the pipeline.

As referred to above, the method presented in this disclosure provides for real time analysis of the possible features in a pipeline, irrespective of the location of the pressure transducer. Referring now to FIG. 34, there is shown a plot 3200 of the leak location error when the pressure transducer is at an interior point of the pipeline (400 metres downstream from the reservoir 6030 in FIG. 25)

instead of being located at the end of the pipeline. To facilitate the analysis of the results, two segments of pipe (equivalent to 12 metres in length) were eliminated at both the extreme ends of the pipeline and also adjacent to the measurement point. The 1D Convolutional ANN was trained on 25,000 samples and tested on 25,000 samples. In this example, the average absolute error was 1.05 metres for the training samples and 1.23 metres for the testing samples. This shows the applicability of the method when the pressure transducer is not located at the end of the pipeline. In the same way, the analysis method in accordance with the present disclosure will also accommodate where the generation of the transient pressure wave occurs at a different location along the pipeline.

The method and systems of the present disclosure can also be applied if there is more than one pressure transducer installed along the pipeline when the transient pressure wave is generated. By training the ANN with samples that include the transient pressure trace in two or more pressure transducers, the performance of the testing phase of the ANN may be further improved. The use of multiple pressure transducers can assist in eliminating the large errors close to the boundary conditions of the pipeline while maintaining performance in the predictions along the pipeline.

Figure 35:
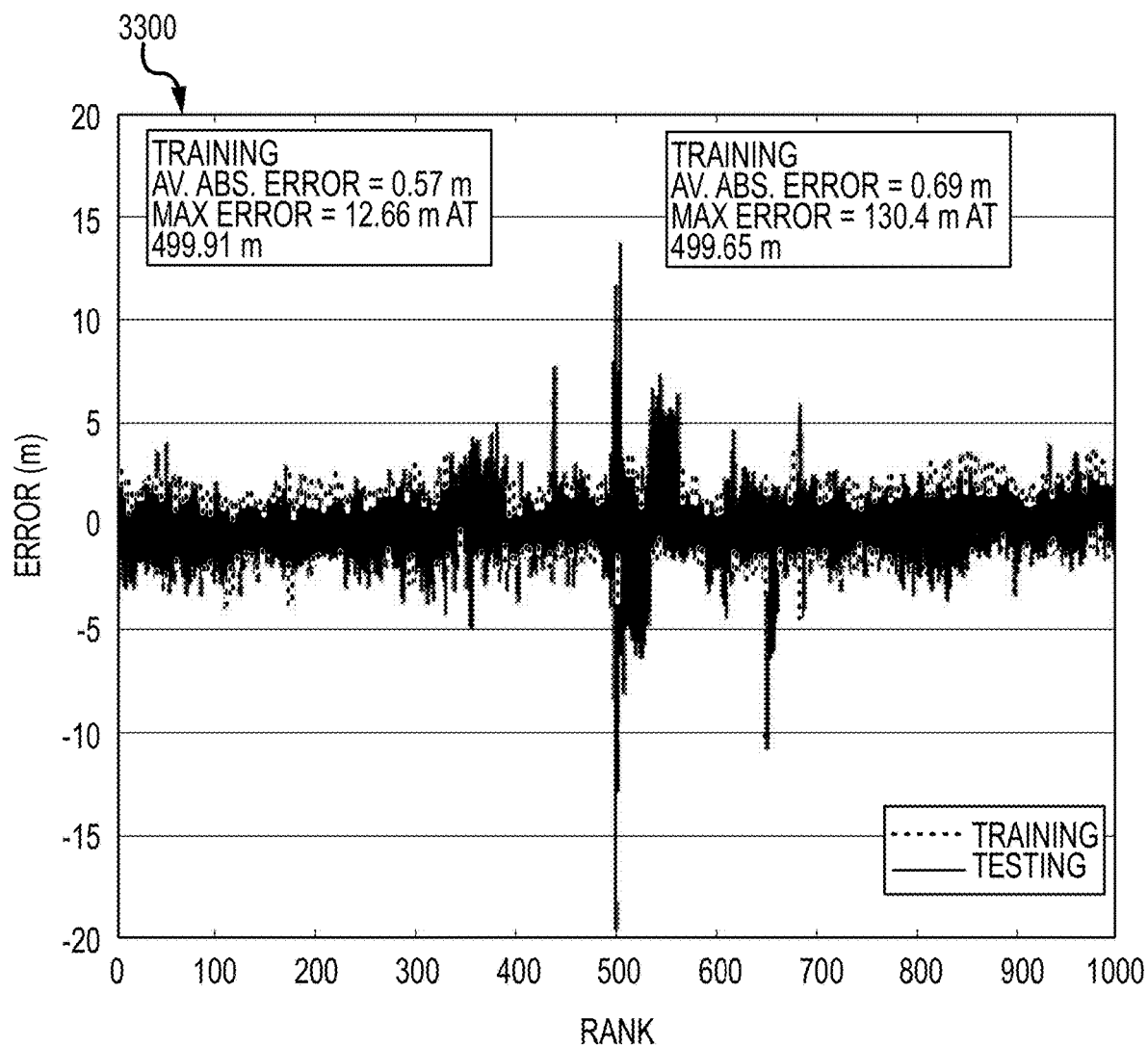
FIG. 35 is a plot of the leak location error as determined by the ANN trained on 25,000 samples and tested on 25,000 additional samples when two pressure transducers are installed along the pipeline.

Referring now to FIG. 35, there is shown the results 3300 of the training and testing of an ANN to detect leaks when two pressure transducers are installed along the pipeline. The results showed an improvement in the leak location average absolute error; in the training phase, the error was 0.57 metres and in the testing phase, the error was 0.69 metres. In addition, the maximum errors are not as frequent and are no longer located at the extremes of the pipeline.

Figure 36:
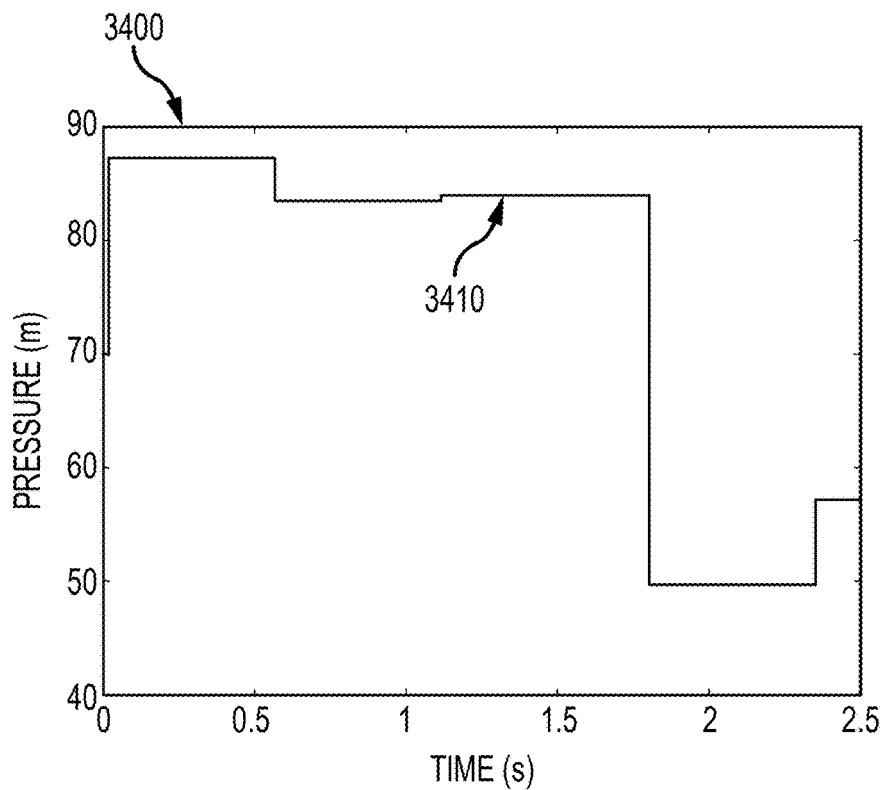
FIG. 36 is a plot of an example of a downsampled transient pressure wave interaction signal corresponding to the presence of a pipe series junction along the pipeline located 691 metres downstream the reservoir.

The two examples of ANNs trained to identify and characterise the presence of a pipes series junction (system 6000 shown in FIG. 8) and a leak (system 2300 shown in FIG. 25) are part of the process described in FIG. 3, at step 320. Referring back to this figure, by using each of the trained ANNs one at a time to determine whether a hydraulic feature of a given type is present, a cascade or series of ANNs trained for each hydraulic feature type may be employed. For this example, a detected transient pressure wave interaction signal (see step 120 of FIG. 1) corresponding to the presence of a pipe series junction located 691 metres downstream of the reservoir 6030 is used. As shown in FIG. 3, at step 310 the transient pressure wave interaction signal is downsampled to match the input size for the ANN. The downsampled pressure interaction signal caused by the presence of a pipes series junction is shown in FIG. 36.

Following the procedure described in FIG. 3, the downsampled transient pressure interaction trace 3410 is tested in the ANN trained for detect leaks (considering system 2300). The results from this (see step 330) show a possible leak located 331.1 metres downstream of the reservoir 6030 in system 2300 and with a leak size of 7.01 mm. At step 340 the determination of the type of the hydraulic feature and the associated hydraulic feature characteristics are verified. Referring again to FIG. 4, in this example, a numerical pressure wave interaction signal 3510 for a leak with these characteristics is generated and is shown in FIG. 37 where a comparison with the measured pressure interaction traces 3410 is provided.

Figure 37:
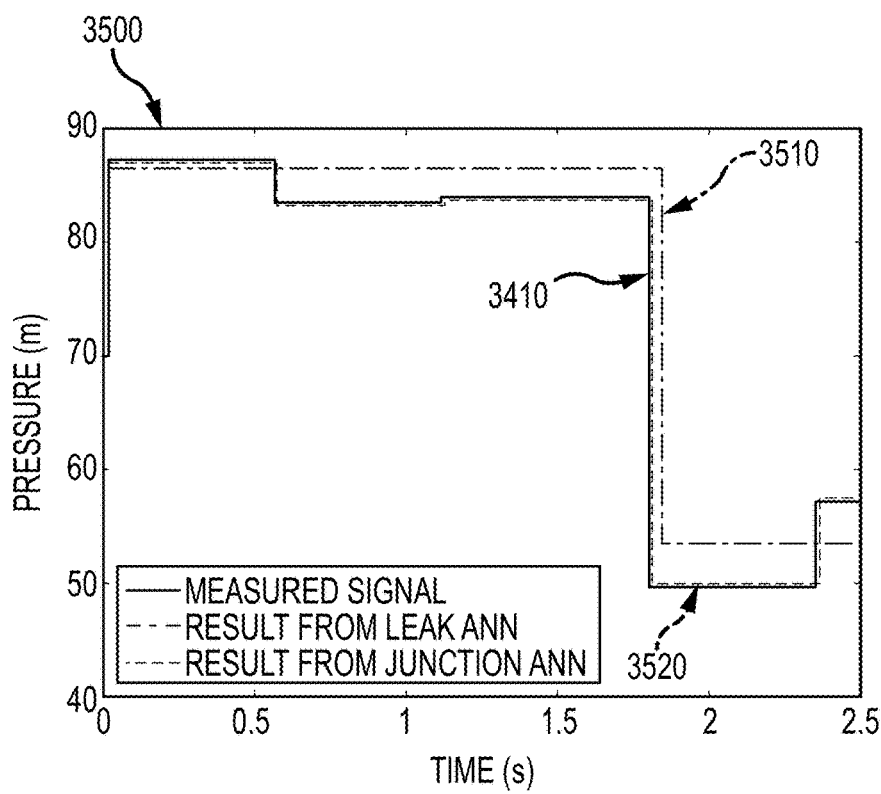
FIG. 37 is a plot of the comparison between the measured pressure wave interaction signal and the numerically generated pressure wave interaction signals based on the results predicted by an ANN trained to locate leaks and an ANN trained to locate pipe series junctions.

By inspection of FIG. 37, it can be seen that there is a poor fit between the two pressure interaction traces 3410 and 3510 corresponding to a "NO" result from comparing the numerical results with the measured results at step 345 of FIG. 4. This indicates that a leak has not been determined. In accordance with method 300, the next type of hydraulic feature is selected at step 350 and the same measured downsampled transient pressure wave interaction signal 3410 is now tested by the ANN trained to determine a hydraulic feature in the form of a pipe series junctions (according to system 600).

This ANN then determines that the pipe series junction is located 689.8 metres compared to the actual value of 691 metres. Once again, a numerical pressure wave interaction signal 3520 is generated but this time for a pipe series junction having the ANN determined characteristics and as can be seen in FIG. 37, where there is shown a comparison between the measured and generated pressure wave interaction signals 3410, 3520, it call be seen that there is an excellent fit. This then verifies that the hydraulic feature has been properly determined.

Figure 38:
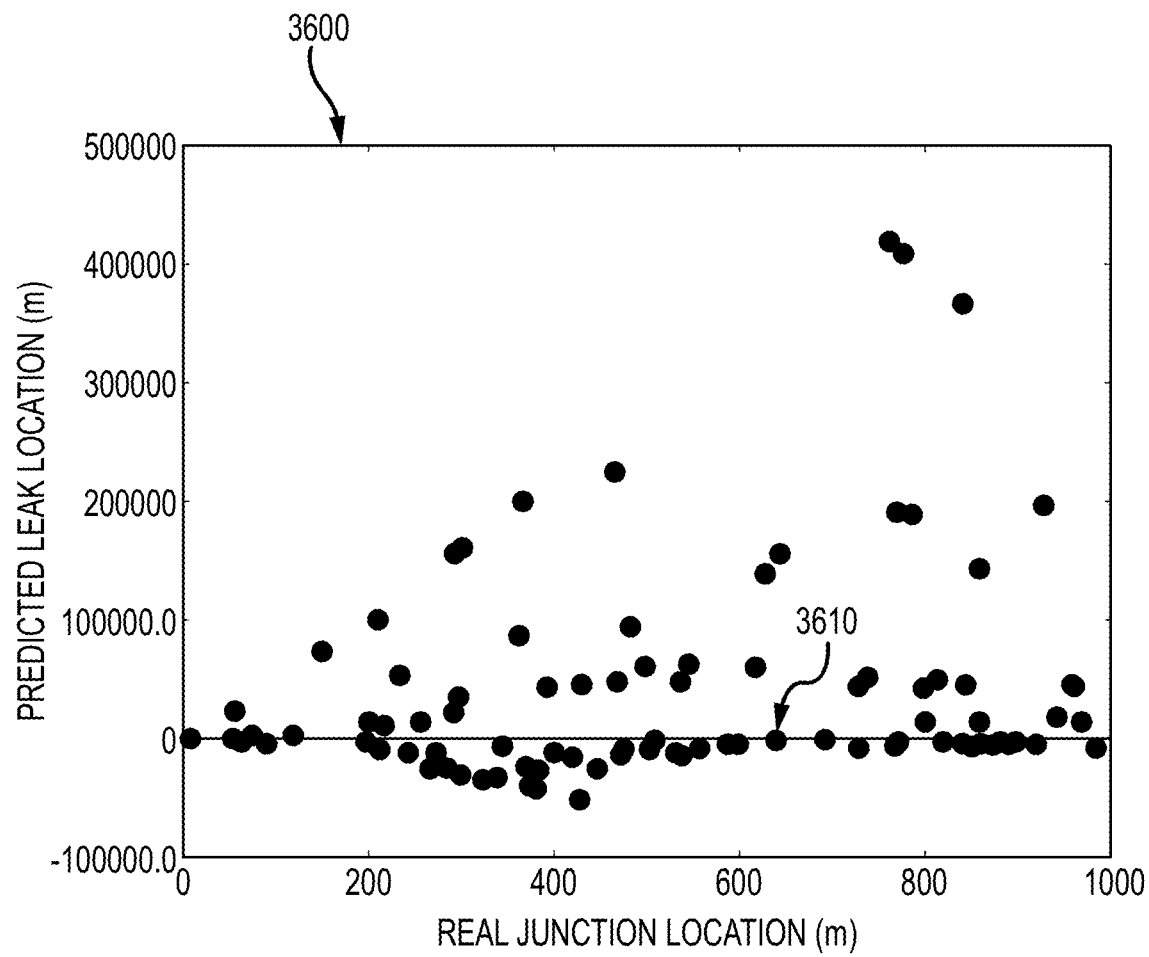
FIG. 38 is a scatter plot of the location of a leak when 100 different pressure interaction signals, corresponding a pipe series junctions, are tested in the ANN trained for detecting leaks.

Referring now to FIG. 38, there is shown a scatter plot 3600 of the location of a leak for 100 different pressure wave interaction signals that correspond to the presence of a pipes series junction as determined by an ANN trained for detecting leaks. By inspection of the figure is evident that the ANN trained to detect leaks predicts, for the most part, results that are out of the range of the pipeline (less than zero and greater than the length 1,000 metres of the pipeline).

In this example, a total of 99 out of the 100 pipes series junction transient pressure traces resulted in leak location predictions that were beyond the physical ends of the pipeline. Only one was within range (for a pipe series junction located at 691 metres) and this was presented in FIG. 37. The location of this example is indicated as 3610 in the figure and due to the scale is not visible. This figure shows that depending on the prediction of the ANN, that the verification steps 341 and 345 of FIG. 4 which involve numerically generating a pressure wave interaction signal and comparing this to the measure pressure wave interaction signal may not be required as the determined hydraulic feature characteristics determined by the ANN falls outside of the physical system and are not logical.

Although, the examples shown above considered a specific pipeline; however, using the non dimensional transformation described with respect to FIG. 19, imply that any pipeline can be tested by those trained ANNs. If a pipe series junction or a leak was going to be identified in a different pipeline, the procedure described in FIG. 3 would in this case involve a non-dimensional transformation of the transient pressure wave interaction signal. First, the non-dimensional approach described in FIG. 19 would be applied to the measured signal, followed by an inverse transformation considering the characteristics of the system in which the ANN was trained. This allows the ANN to be applied to different systems. In addition, the pre-processing step 540 of the input data (see FIG. 7) before the training process may include the non-dimensionalisation of the transient pressure traces and the resulting ANN would be then able to locate hydraulic features for any pipeline.

As would be appreciated, method and system for analysing pipeline condition implemented in accordance with the present disclosure are of general application as multiple different ANNs trained for particular hydraulic feature types and their associated hydraulic feature characteristics may be trained and applied. Furthermore, the present method and system does not rely on any a priori knowledge of the pipeline or pipeline system being analysed as each respective ANN may be trained for multiple different hydraulic feature types and applied as required.

By contrast with previous approaches, instead of the computational effort occurring following detection of a transient pressure wave interaction signal where any analysis must be carried out off line and leads to delay, in the approach of the present disclosure the computational effort is concentrated in the ANN training stage which can occur prior to any assessment task and once the ANN has been trained then analysis and assessment of a pipeline can occur in real time.

As referred to above, as long as the hydraulic feature type is able to be mathematically modelled using an appropriate hydraulic water hammer simulation model of the pipeline containing the feature and training (and testing) sample sets of downsampled transient pressure wave signals be generated that cover an appropriate range of associated hydraulic feature characteristics then a respective ANN may be trained (and tested) on these sample sets to be then applied when analysing a measured transient pressure wave interaction signal. Recognising that both the training, testing and analysis data may be substantially downsampled greatly reduces the computational effort required in training the ANN, testing the ANN and eventually applying the ANN during analysis.

In other examples, the ANN may also be trained on training data comprising empirical or experimental data based on measured transient pressure wave interaction signals arising from a known hydraulic feature type having known associated hydraulic feature characteristics that is present in an assessed pipeline. These transient pressure wave interaction signals may then be downsampled in the time domain to generate respective downsampled time windows of pressure information which with their corresponding values of the hydraulic feature characteristics as determined empirically for the pipeline present may then be used to train an ANN to identify a hydraulic feature type corresponding to that present in the assessed pipeline.

In other embodiments, where the generated pressure wave involves a more complex input pulse signal (eg, consisting of a PRBS) then the pressure wave interaction signal may be in the form of an impulse response function which is then downsampled and processed to analyse the region of interest of the pipeline. In accordance with the present disclosure, a series of ANNs would then be initially trained using as training examples the respective numerically downsampled impulse response functions corresponding to different types of hydraulic features and their associated hydraulic feature characteristics. These trained ANNs would then be applied to the detected downsampled impulse response functions in order to locate and characterise hydraulic features in the pipeline.

Those of skill in the art would further appreciate that the various illustrative logical blocks, modules, circuits, and algorithm steps described in connection with the disclosed embodiments may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. In various embodiments of the present disclosure, a single component or module may be replaced by multiple components, and multiple components may be replaced by a single component, to perform a given function or functions.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for analyzing a condition of a pipeline in real time, comprising:
generating a transient pressure wave in fluid carried along the pipeline;
detecting a transient pressure wave interaction signal responsive to the transient pressure wave, the transient pressure wave interaction signal having a time duration corresponding to a region of interest of the pipeline; and
processing the transient pressure wave interaction signal to analyze the region of interest of the pipeline, wherein processing the transient pressure wave interaction signal comprises:
downsampling in the time domain the transient pressure wave interaction signal to generate a downsampled time window of pressure information;
processing the downsampled time window of pressure information by an artificial neural network (ANN) trained to identify a hydraulic feature of a first type and determine associated hydraulic feature characteristics of the hydraulic feature of the first type; and
verifying whether the hydraulic feature of the first type occurs in the region of interest of the pipeline.

2. The method of claim 1, wherein verifying whether the hydraulic feature of the first type occurs in the region of interest comprises determining whether one or more of the determined associated hydraulic feature characteristics of the hydraulic feature of the first type are within physical constraints of the pipeline.

3. The method of claim 1, wherein verifying whether the hydraulic feature of the first type occurs in the region of interest, comprises:
numerically generating a transient pressure wave interaction signal based on the hydraulic feature of the first type and the associated determined hydraulic feature characteristics;
comparing the numerically generated transient pressure wave interaction signal with the detected transient pressure wave interaction signal to verify that the hydraulic feature of the first type occurs in the region of interest.

4. The method of claim 1, further comprising:
processing the downsampled time window of pressure information by an artificial neural network (ANN) trained to determine a hydraulic feature of a second type and determine associated hydraulic feature characteristics of the hydraulic feature of the second type; and verifying whether the hydraulic feature of the second type occurs in the region of interest of the pipeline.

5. The method of claim 4, wherein verifying whether a hydraulic feature of the second type occurs in the region of interest comprises determining whether one or more associated determined hydraulic feature characteristics of the hydraulic feature of the second type are within physical constraints of the pipeline.

6. The method of claim 4, wherein verifying whether a hydraulic feature of the second type occurs comprises:

numerically generating a transient pressure wave interaction signal based on the hydraulic feature of the second type and the associated determined hydraulic feature characteristics; and comparing the numerically generated transient pressure wave interaction signal with the detected transient pressure wave interaction signal to verify that the hydraulic feature of the second type occurs in the region of interest.

7. The method of claim 1, wherein verifying whether a hydraulic feature of a selected type occurs comprises:

numerically generating a transient pressure wave interaction signal based on the hydraulic feature of the selected type and the associated determined hydraulic feature characteristics of the hydraulic feature of the selected type;

downsampling in the time domain the numerically generated transient pressure wave interaction signal to determine a numerically generated downsampled time window of pressure information; and comparing the numerically generated downsampled time window of pressure information with the generated downsampled time window of pressure information to verify that the hydraulic feature of the selected type occurs in the region of interest.

8. The method of claim 1, wherein an associated hydraulic feature characteristic includes a location of the hydraulic feature.

9. The method of claim 1, wherein an ANN trained to identify a hydraulic feature of a selected type and determine associated hydraulic feature characteristics of the hydraulic feature of the selected type is trained by:

selecting a range of values of the associated hydraulic feature characteristics of the hydraulic feature of the selected type;

numerically generating respective transient pressure wave interaction signals for the range of values of the hydraulic feature characteristics based on a hydrodynamic model of the pipeline;

downsampling in the time domain the respective transient pressure wave interaction signals to form respective downsampled time windows of pressure information each having a size or dimension corresponding to an input dimension of the ANN; and training the ANN to identify the hydraulic feature of the selected type and determine the associated values of the hydraulic feature characteristics based on each of the downsampled time windows of pressure information and corresponding values of the hydraulic feature characteristics used to generate the downsampled time window of pressure information.

10. The method of claim 9, wherein training the ANN to identify the hydraulic feature of the selected type and determine the associated values of the hydraulic feature characteristics comprises training the ANN using one or more empirically measured downsampled time windows of pressure information and corresponding values of the hydraulic feature characteristics originating from the hydraulic feature of the selected type.

11. A system for analyzing the condition of a pipeline, the system including:

a transient pressure wave generator for generating a transient pressure wave in fluid carried along the pipe;

a pressure detector for detecting a transient pressure wave interaction signal having a time duration corresponding to a region of interest of the pipeline; and an analysis module comprising one or more data processors for processing in real-time the transient pressure wave interaction signal to analyze the region of interest of the pipeline, wherein processing the transient pressure wave interaction signal by the analysis module comprises:

downsampling in the time domain the transient pressure wave interaction signal to generate a downsampled time window of pressure information;

processing the downsampled time window of pressure information by an artificial neural network (ANN) trained to identify a hydraulic feature of a first type and determine associated hydraulic feature characteristics of the hydraulic feature of the first type; and verifying whether the hydraulic feature of the first type occurs in the region of interest of the pipeline.

12. The system of claim 11, wherein verifying by the analysis module whether the hydraulic feature of the first type occurs in the region of interest comprises determining whether one or more of the determined associated hydraulic feature characteristics of the hydraulic feature of the first type are within physical constraints of the pipeline.

13. The system of claim 11, wherein verifying by the analysis module whether the hydraulic feature of the first type occurs in the region of interest comprises:

numerically generating a transient pressure wave interaction signal based on the hydraulic feature of the first type and the associated determined hydraulic feature characteristics;

comparing the numerically generated transient pressure wave interaction signal with the detected transient pressure wave interaction signal to verify that the hydraulic feature of the first type occurs in the region of interest.

14. The system of claim 11, further comprising:

processing by the analysis module the downsampled time window of pressure information by an artificial neural network (ANN) trained to determine a hydraulic feature of a second type and determine associated hydraulic feature characteristics of the hydraulic feature of the second type; and verifying by the analysis module whether the hydraulic feature of the second type occurs in the region of interest of the pipeline.

15. The system of claim 14, wherein verifying by the analysis module whether a hydraulic feature of the second type occurs in the region of interest comprises determining whether one or more associated determined hydraulic feature characteristics of the hydraulic feature of the second type are within physical constraints of the pipeline.

16. The system of claim 14, wherein verifying by the analysis module whether a hydraulic feature of the second type occurs comprises:

numerically generating a transient pressure wave interaction signal based on the hydraulic feature of the second type and the associated determined hydraulic feature characteristics; and comparing the numerically generated transient pressure wave interaction signal with the detected transient pressure wave interaction signal to verify that the hydraulic feature of the second type occurs in the region of interest.

17. The system of claim 11, wherein verifying by the analysis module whether a hydraulic feature of a selected type occurs comprises:

numerically generating a transient pressure wave interaction signal based on the hydraulic feature of the selected type and the associated determined hydraulic feature characteristics of the hydraulic feature of the selected type;

downsampling in the time domain the numerically generated transient pressure wave interaction signal to determine a numerically generated downsampled time window of pressure information; and comparing the numerically generated downsampled time window of pressure information with the generated downsampled time window of pressure information to verify that the hydraulic feature of the selected type occurs in the region of interest.

18. The system of claim 11, wherein an associated hydraulic feature characteristic includes a location of the hydraulic feature.

19. The system of claim 11, wherein an ANN trained to identify a hydraulic feature of a selected type and determine associated hydraulic feature characteristics of the hydraulic feature of the selected type is trained by:

selecting a range of values of the associated hydraulic feature characteristics for the hydraulic feature of the selected type;

numerically generating respective transient pressure wave interaction signals for the range of values of the hydraulic feature characteristics based on a hydrodynamic model of the pipeline;

downsampling in the time domain the respective transient pressure wave interaction signals to form respective downsampled time windows of pressure information each having a size or dimension corresponding to an input dimension of the ANN; and training the ANN to identify the hydraulic feature of the selected type and determine the associated values of the hydraulic feature characteristics based on each of the downsampled time windows of pressure information and the corresponding values of the hydraulic feature characteristics used to generate the downsampled time window of pressure information.

20. The system of claim 19, wherein training the ANN to identify the hydraulic feature of the selected type and determine the associated values of the hydraulic feature characteristics comprises training the ANN using one or more empirically measured downsampled time windows of pressure information and corresponding values of the hydraulic feature characteristics originating from the hydraulic feature of the selected type.

* * * * *